(12) United States Patent
Yoon et al.

(10) Patent No.: US 12,530,051 B2
(45) Date of Patent: Jan. 20, 2026

(54) DISPLAY APPARATUS

(71) Applicant: Samsung Display Co., LTD., Yongin-si (KR)

(72) Inventors: Hyoyul Yoon, Yongin-si (KR); Eunhye Kang, Yongin-si (KR); Kyoungah Lee, Yongin-si (KR); Mingu Kim, Yongin-si (KR); Hyunjun Kim, Yongin-si (KR); Yu Deok Seo, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 170 days.

(21) Appl. No.: 18/375,529

(22) Filed: Oct. 1, 2023

(65) Prior Publication Data

US 2024/0192729 A1 Jun. 13, 2024

(30) Foreign Application Priority Data

Dec. 8, 2022 (KR) .................... 10-2022-0170867

(51) Int. Cl.
*G06F 1/16* (2006.01)
(52) U.S. Cl.
CPC .......... *G06F 1/1652* (2013.01); *G06F 1/1656* (2013.01)
(58) Field of Classification Search
CPC .................................................... G06F 1/1652
See application file for complete search history.

(56) References Cited

U.S. PATENT DOCUMENTS

| 6,577,496 | B1 * | 6/2003 | Gioscia | H04M 1/0216 |
| | | | | 455/344 |
| 10,289,163 | B2 * | 5/2019 | Huitema | G06F 1/163 |
| 10,602,631 | B2 | 3/2020 | Song et al. | |
| 11,474,561 | B2 * | 10/2022 | Kim | G06F 1/1656 |
| 12,019,471 | B2 * | 6/2024 | Kim | G06F 1/1656 |
| 12,243,448 | B2 * | 3/2025 | Lee | G09F 9/301 |
| 2015/0043174 | A1 * | 2/2015 | Han | G02F 1/13452 |
| | | | | 428/156 |
| 2016/0104850 | A1 * | 4/2016 | Joo | G09G 3/006 |
| | | | | 428/116 |
| 2018/0153049 | A1 * | 5/2018 | Song | G06F 1/1601 |
| 2018/0192527 | A1 * | 7/2018 | Yun | G06F 1/1681 |
| 2020/0389986 | A1 * | 12/2020 | Tsuchihashi | G06F 1/1626 |
| 2021/0251090 | A1 * | 8/2021 | Ha | B32B 15/04 |

(Continued)

FOREIGN PATENT DOCUMENTS

KR 1020180062195 A 6/2018

*Primary Examiner* — Adrian S Wilson
(74) *Attorney, Agent, or Firm* — CANTOR COLBURN LLP

(57) ABSTRACT

A display device includes a display panel, which includes a folding region, which is foldable around a folding axis extending in a first direction, and first and second non-folding regions spaced apart from each other with the folding region therebetween, and a lower member disposed below the display panel. The lower member includes a first high-rigidity part, a first low-rigidity part, a second high-rigidity part, a second low-rigidity part, and a third high-rigidity part, each of which overlaps the folding region and which are arranged in a second direction crossing the first direction. Each of the first and second low-rigidity parts has a modulus less than a modulus of a high-rigidity part adjacent thereto in the second direction among the first high-rigidity part, the second high-rigidity part and the third high-rigidity part.

27 Claims, 22 Drawing Sheets

(56) References Cited

U.S. PATENT DOCUMENTS

| | | | |
|---|---|---|---|
| 2021/0365083 A1* | 11/2021 | Li | C08J 7/042 |
| 2022/0189349 A1* | 6/2022 | Roh | B32B 15/08 |
| 2022/0283606 A1* | 9/2022 | Kim | G06F 1/1615 |

* cited by examiner

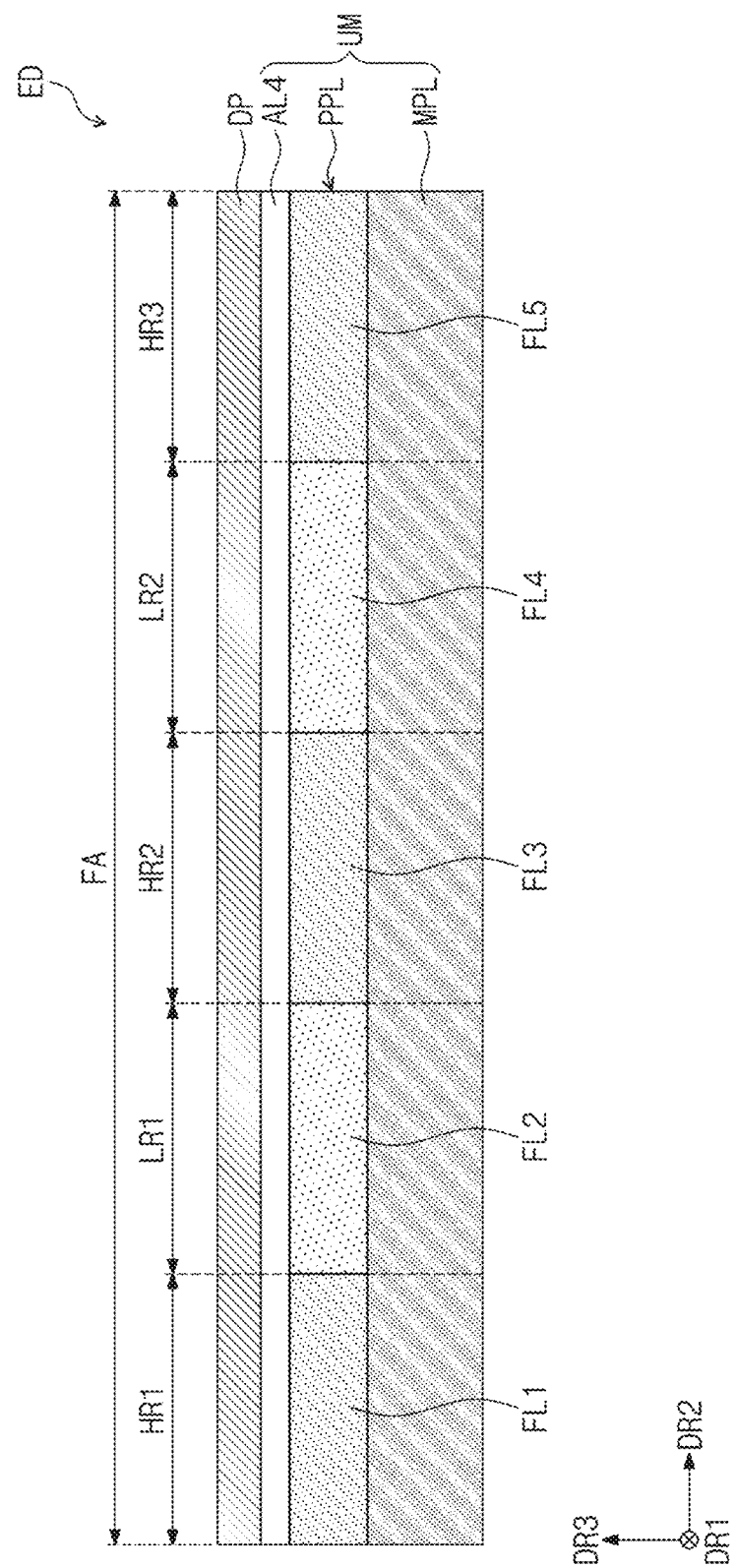

DISPLAY APPARATUS

This application claims priority to Korean Patent Application No. 10-2022-0170867, filed on Dec. 8, 2022, and all the benefits accruing therefrom under 35 U.S.C. § 119, the content of which in its entirety is herein incorporated by reference.

BACKGROUND

1. Field

Embodiments of the disclosure herein relate to a display device, and more particularly, to a foldable display device.

2. Description of the Related Art

Multimedia electronic devices such as televisions, mobile phones, tablet computers, navigation devices and game consoles, may include display devices for displaying images. Recently, with the technical development of the display devices, various flexible display devices are being developed which are changed in a curved shape or are foldable or rollable. As the flexible display devices are variously changeable in shape, the flexible display devices may be portable and improve users' convenience.

SUMMARY

In a flexible display device, stacked members included therein are desired to be easily folded or bent and also desired to have physical properties of minimizing the display devices from being deformed even when folding or bending is repeated.

The disclosure provides a display device that prevents creases from occurring in a folding region and the creases of the folding region from being visible from the outside.

An embodiment of the invention provides a display device including a display panel including a folding region, which is foldable around a folding axis extending in a first direction, and first and second non-folding regions spaced apart from each other with the folding region therebetween, and a lower member disposed below the display panel. In such an embodiment, the lower member includes a first high-rigidity part, a first low-rigidity part, a second high-rigidity part, a second low-rigidity part, and a third high-rigidity part, each of which overlaps the folding region and which are arranged in a second direction crossing the first direction. In such an embodiment, each of the first and second low-rigidity parts has a modulus less than a modulus of a high-rigidity part adjacent thereto in the second direction among the first high-rigidity part, the second high-rigidity part and the third high-rigidity part.

In an embodiment, the lower member may include a plate layer, and the plate layer may include first to third high-rigidity portions corresponding to the first to third high-rigidity parts, respectively, and first and second low-rigidity portions corresponding to the first and second low-rigidity parts, respectively. Each of the first and second low-rigidity portions may have a modulus less than a modulus of a high-rigidity portion adjacent thereto in the second direction among the first to third high-rigidity portions.

In an embodiment, the first high-rigidity portion and the third high-rigidity portion may be symmetrical with respect to the second high-rigidity portion, and the first low-rigidity portion and the second low-rigidity portion may be symmetrical with respect to the second high-rigidity portion.

In an embodiment, the first to third high-rigidity portions may have a same modulus as each other.

In an embodiment, at least two selected from the first to third high-rigidity portions may have different moduli from each other.

In an embodiment, opening portions may be defined through the plate layer in each of the first and second low-rigidity portions.

In an embodiment, first opening portions, second opening portions, third opening portions, fourth opening portions, and fifth opening portions may be defined in the first high-rigidity portion, the first low-rigidity portion, the second high-rigidity portion, the second low-rigidity portion, and the third high-rigidity portion, respectively.

In an embodiment, the first to fifth opening portions may extend in the first direction and may be spaced apart from each other in the second direction.

In an embodiment, a planar area of each of the first opening portions of the first high-rigidity portion may be less than a planar area of each of the second opening portions of the first low-rigidity portion.

In an embodiment, a gap between the first opening portions of the first high-rigidity portion may be greater than a gap between the second opening portions of the first low-rigidity portion in the second direction.

In an embodiment, recessed portions, each of which is recessed from one surface of the plate layer, may be defined in each of the first and second low-rigidity portions.

In an embodiment, first recessed portions, second recessed portions, third recessed portions, fourth recessed portions, and fifth recessed portions may be defined in the first high-rigidity portion, the first low-rigidity portion, the second high-rigidity portion, the second low-rigidity portion, and the third high-rigidity portion, respectively. In such an embodiment, the first to fifth recessed portions may be spaced apart from each other in the second direction.

In an embodiment, a width of each of the first recessed portions of the first high-rigidity portion may be less than a width of each of the second recessed portions of the first low-rigidity portion in the second direction.

In an embodiment, a gap between the first recessed portions of the first high-rigidity portion may be greater than a gap between the second recessed portions of the first low-rigidity portion in the second direction.

In an embodiment, a depth of each of the first recessed portions of the first high-rigidity portion may be less than a depth of each of the second recessed portions of the first low-rigidity portion in a thickness direction of the plate layer.

In an embodiment, the first high-rigidity portion may have a thickness greater than a thickness of the first low-rigidity portion.

In an embodiment, the thickness of the first high-rigidity portion may be uniform in the second direction.

In an embodiment, the thickness of the first high-rigidity portion may be variable in the second direction.

In an embodiment, the lower member may include a cushion layer, and the cushion layer may include a first cushion part, a second cushion part, a third cushion part, a fourth cushion part, and a fifth cushion part which correspond to the first high-rigidity part, the first low-rigidity part, the second high-rigidity part, the second low-rigidity part, and the third high-rigidity part, respectively. In such an embodiment, each of the first to fifth cushion parts may include a matrix part with pores dispersed in the matrix part, and each of the second cushion part and the fourth cushion part may have a modulus less than a modulus of the cushion part adjacent thereto in the second direction.

In an embodiment, the matrix part of each of the first to fifth cushion parts may include a same material as each other.

In an embodiment, a ratio of the pores in the first cushion part may be less than a ratio of the pores in the second cushion part.

In an embodiment, the lower member may include a protective layer, and the protective layer may include a first film part, a second film part, a third film part, a fourth film part, and a fifth film part which correspond to the first high-rigidity part, the first low-rigidity part, the second high-rigidity part, the second low-rigidity part, and the third high-rigidity part, respectively. In such an embodiment, each of the second film part and the fourth film part may have a modulus less than a modulus of the film part adjacent thereto in the second direction.

In an embodiment, the lower member may include a protective layer, and an adhesive layer disposed between the display panel and the protective layer. In such an embodiment, the adhesive layer may include a first adhesive part, a second adhesive part, a third adhesive part, a fourth adhesive part, and a fifth adhesive part which correspond to the first high-rigidity part, the first low-rigidity part, the second high-rigidity part, the second low-rigidity part, and the third high-rigidity part, respectively. In such an embodiment, each of the second adhesive part and the fourth adhesive part may have a modulus less than a modulus of the adhesive part adjacent thereto in the second direction.

In an embodiment, the first adhesive part and the second adhesive part may include a same ultraviolet curable resin as each other, and a curing degree of the first adhesive part may be different from a curing degree of the second adhesive part.

In an embodiment, the display panel may include a first curvature part corresponding to a center of the folding region, a second curvature part extending from one side of the first curvature part, and a third curvature part extending from an opposing side of the first curvature part. In such an embodiment, the first curvature part may have a curvature greater than a curvature of each of the second curvature part and the third curvature part. In such an embodiment, the first to third high-rigidity parts and the first and second low-rigidity parts overlap the first curvature part.

In an embodiment of the invention, a display device includes a display panel including a folding region, which is foldable around a folding axis and includes one side and an opposing side, each of which extends in a first direction, a first non-folding region extending from the one side, and a second non-folding region extending from the other side, and a lower member disposed below the display panel. In such an embodiment, the lower member includes a middle high-rigidity part corresponding to a center of the folding region, a first high-rigidity part corresponding to the one side of the folding region, a second high-rigidity part corresponding to the opposing side of the folding region, a first low-rigidity part disposed between the middle high-rigidity part and the first high-rigidity part and having a less modulus than each of the middle high-rigidity part and the first high-rigidity part, and a second low-rigidity part disposed between the middle high-rigidity part and the second high-rigidity part and having a less modulus than each of the middle high-rigidity part and the second high-rigidity part.

In an embodiment, the lower member may include an adhesive layer, a protective layer, and a plate layer, each of which overlaps the folding region, the first non-folding region, and the second non-folding region. In such an embodiment, the middle high-rigidity part, the first high-rigidity part, the second high-rigidity part, the first low-rigidity part, and the second low-rigidity part may be defined in at least one selected from the adhesive layer, the protective layer, and the plate layer.

BRIEF DESCRIPTION OF THE DRAWINGS

The above and other features of the invention will become more apparent by describing in further detail embodiments thereof with reference to the accompanying drawings, in which:

FIGS. 11A and 11B are cross-sectional views of a display device according to an embodiment of the invention;

DETAILED DESCRIPTION

Figure 1:
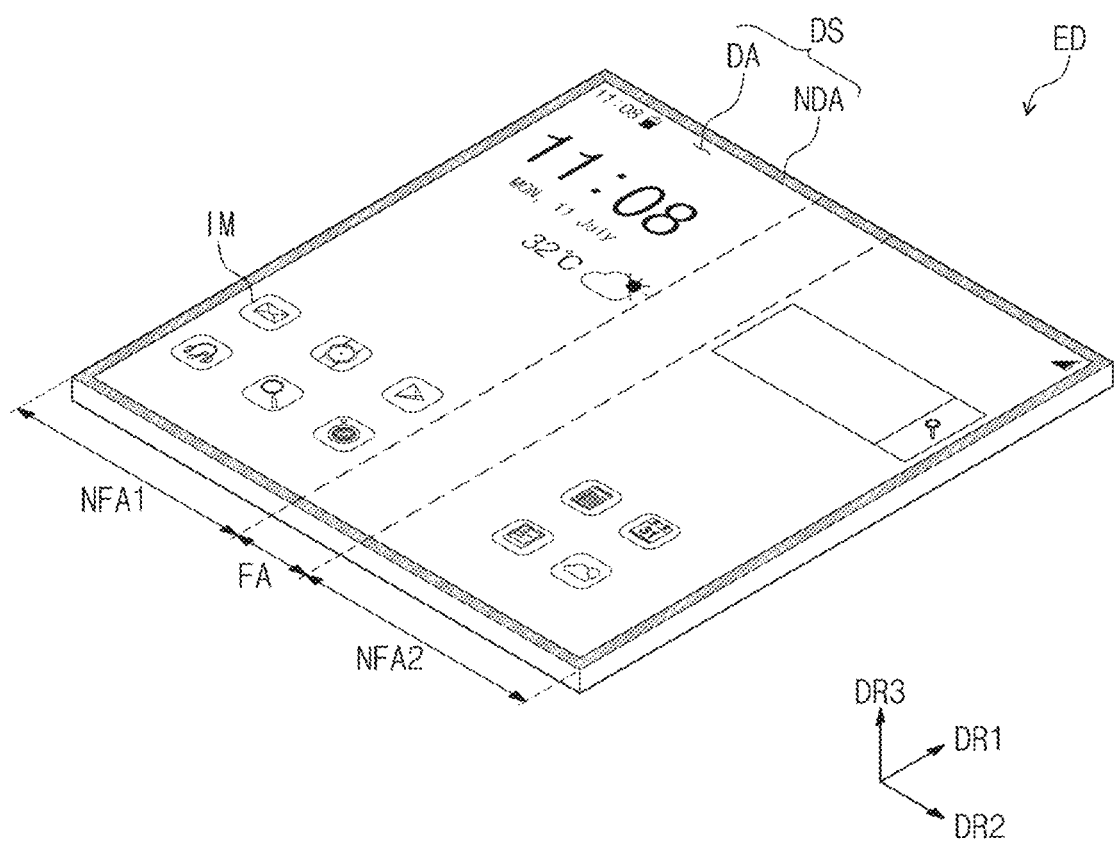
FIG. 1 is a perspective view of a display device according to an embodiment of the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when an element (or region, layer, section, etc.) is referred to as being "on", "connected to" or "coupled to" another element, it can be disposed directly on, connected or coupled to the other element or a third intervening elements may be disposed between the elements.

Like reference numbers or symbols refer to like elements throughout. In addition, in the drawings, the thickness, the ratio, and the dimension of elements are exaggerated for effective description of the technical contents. " "

It will be understood that, although the terms first, second, etc. may be used herein to describe various elements, these elements should not be limited by these terms. These terms are only used to distinguish one element from another element. For example, a first element could be termed a second element without departing from the teachings of the invention, and similarly, a second element could be termed a first element.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items.

In addition, the terms, such as "below", "beneath", "on" and "above", are used for explaining the relation of elements shown in the drawings. The terms are relative concept and are explained based on the direction shown in the drawing.

It will be further understood that the terms such as "comprises", "includes" and "has", when used herein, specify the presence of stated features, numerals, steps, operations, elements, parts, or the combination thereof, but do not preclude the presence or addition of one or more other features, numerals, steps, operations, elements, parts, or the combination thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described in detail with reference to the accompanying drawings.

Figure 2A:
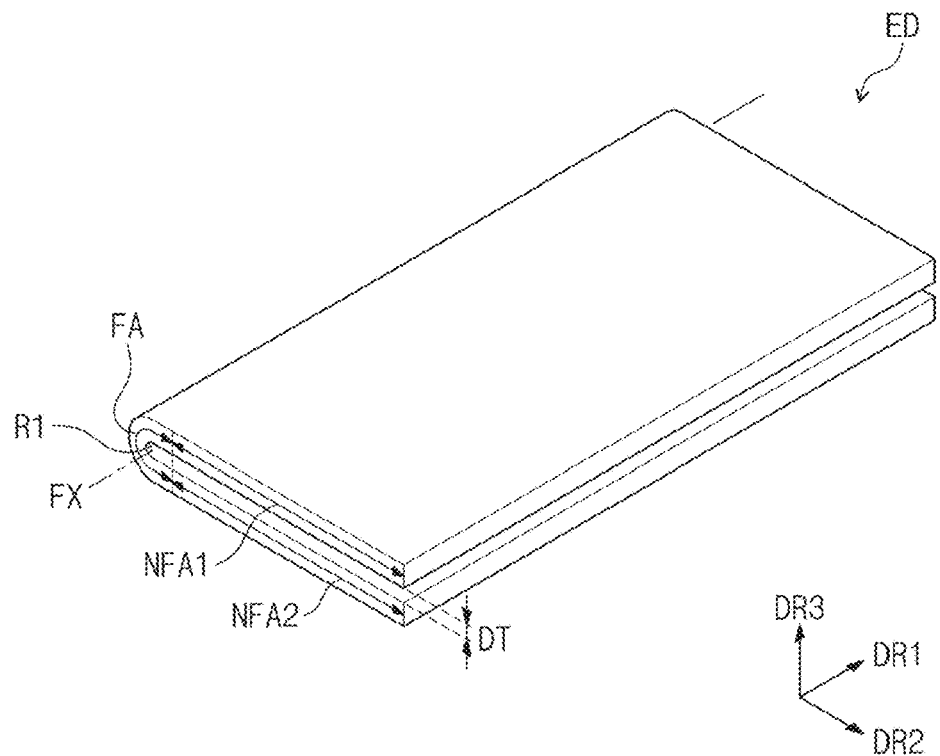
FIGS. 2A to 2C are perspective views of a display device in a folded state according to an embodiment of the invention.
Figure 2B:
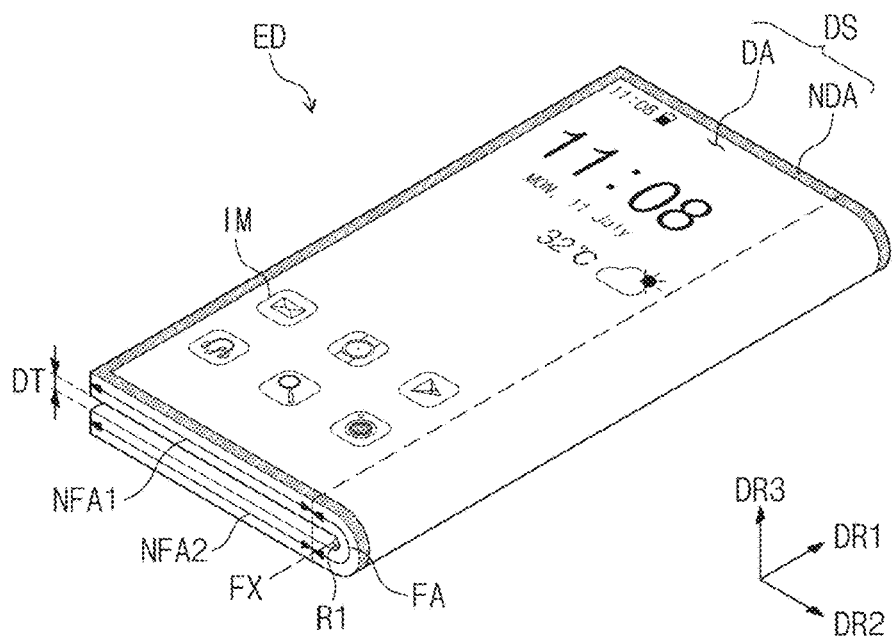
Figure 2C:
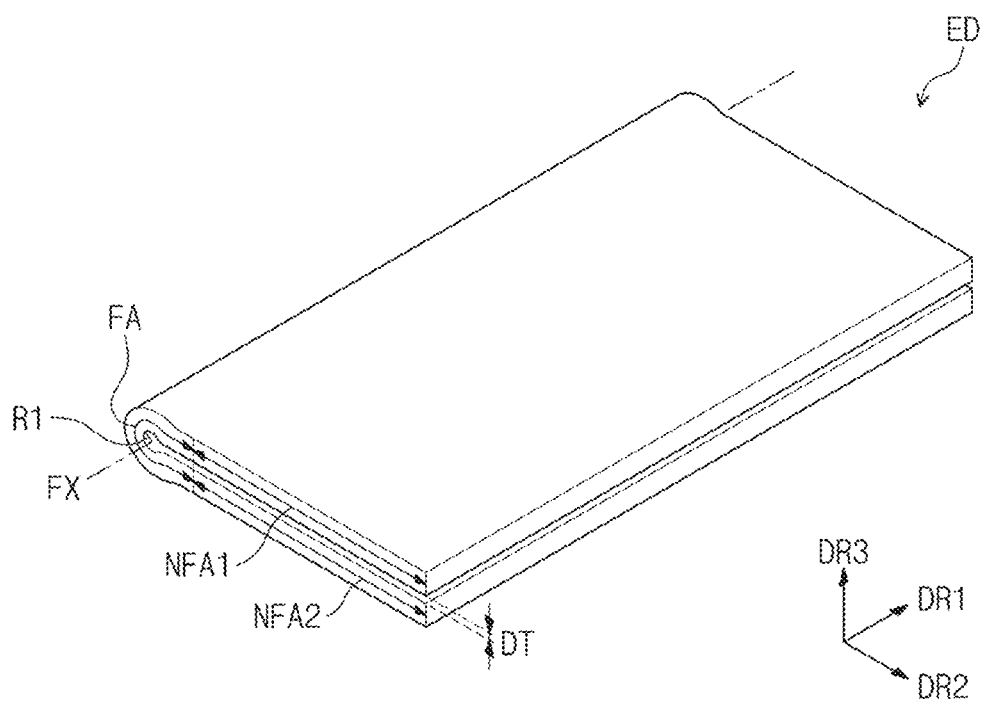

FIG. 1 is a perspective view of a display device ED according to an embodiment of the invention. FIGS. 2A to 2C are perspective views of the display device ED in a folded state according to an embodiment of the invention.

An embodiment of the display device ED may be a device that is activated in response to an electrical signal and displays an image. In an embodiment, for example, the display device ED may be included in a large-sized device such as a television or an outdoor billboard, and also in a small and medium-sized device such as a monitor, a mobile phone, a tablet computer, a navigation device, or a game console. The foregoing embodiments of the display device ED are examples, and the display device ED is not limited to any one unless departing from the invention. In FIGS. 1 and 2A to 2C, embodiments where the display device ED is a mobile phone are illustrated as an example.

The display device ED according to an embodiment may be flexible. The term "flexible" refers to a characteristic of being capable of bending, and may include all from a fully folded structure to a structure capable of bending at the level of several nanometers. For example, the flexible display device ED may include a curved device or a foldable device. In FIGS. 1 and 2A to 2C, embodiments where the flexible display device ED is a foldable device are illustrated as an example.

FIG. 1 illustrates a perspective view of the display device ED in a spread state (or unfolded state). Referring to FIG. 1, the display device ED may have a rectangular shape with sides extending in a first direction DR1 and a second direction DR2, respectively, on a plan view. However, an embodiment of the invention is not limited thereto, and the display device ED may have various shapes such as a circular shape or a polygon shape, on a plan view.

The display device ED in the unfolded state may display an image IM in a third direction DR3 through a display surface DS parallel to each of the first direction DR1 and the second direction DR2. The third direction DR3 may be defined as a direction perpendicular to a plane defined by the first direction DR1 and the second direction DR2. The third direction DR3 may be a thickness direction of the display device ED. A front surface (or top surface) and a rear surface (or bottom surface) of each of members, which constitute the display device ED, may oppose each other in the third direction DR3, and a normal direction to each of the front surface and the rear surface may be substantially parallel to the third direction DR3.

A spaced distance between the front surface and the rear surface, which is defined in the third direction DR3, may correspond to a thickness of the member. In the disclosure, the term "on a plan view" may mean being viewed in the third direction DR3. The term "on a cross-sectional view" herein may be defined as being viewed in the first direction DR1 or the second direction DR2. Here, directions indicated by the first to third directions DR1, DR2 and DR3 are relative concepts and may be changed to other directions.

The display surface DS on which the image IM is displayed may correspond to the front surface of the display device ED. The image IM provided by the display device ED may include not only a dynamic image but also a still image. FIG. 1 illustrates an embodiment where the image IM includes a clock and icon images as an example.

The display surface DS of the display device ED may include a display part DA and a non-display part NDA. The display part DA may be a region of the display surface DS, in which the image IM is displayed. The display device ED may provide a user with the image IM through the display part DA. The non-display part NDA may be a region in which the image IM is not displayed. The non-display part NDA may be a region having a predetermined color and having a lower light transmittance than the display part DA.

The non-display part NDA may be adjacent to the display part DA, and the display part DA may have a shape defined by the non-display part NDA. In an embodiment, for example, the non-display part NDA may surround the display part DA as shown in FIG. 1. However, this is illustrated as an example. Alternatively, the non-display part NDA may be disposed adjacent to only one side of the display part DA, or disposed on a side surface of the display device ED, not on the front surface. According to an embodiment, the non-display part NDA may be omitted.

In an embodiment, the display device ED may detect an external input applied from the outside. The external input may include various types provided from the outside of the display device ED. In an embodiment, for example, the external input may include force, pressure, temperature, light or the like. The external input may include not only an input caused by touching the display device ED (e.g., touch by the user's hand or pen) but also an input (e.g., hovering) applied by approaching the display device ED to a predetermined distance.

In an embodiment, the display device ED may detect the external input applied to a front surface of the display device ED. However, a region of the display device ED, from which the external input is detected, is not limited to the front surface of the display device ED, and alternatively, the display device ED may detect the external input applied to a side surface or a rear surface of the display device ED.

The display device ED may include a folding region FA and a plurality of non-folding regions NFA1 and NFA2. FIG. 1 illustrates an embodiment where the display device ED includes a first non-folding region NFA1 and a second non-folding region NFA2 as an example. The folding region FA may be disposed between the first non-folding region NFA1 and the second non-folding region NFA2. That is, in the unfolded state, the first non-folding regions NFA1, the folding region FA, and the second non-folding region NFA2 of the display device ED may be arranged in the first direction DR2.

The folding region FA may be a region that is flat or bent with predetermined curvature according to a folding operation. In an embodiment, as illustrated in FIG. 1, the folding region FA may be flat in the display device ED in the unfolded state. The first and second non-folding region NFA1 and NFA2 may be each a region that is maintained to be flat in the folded state and in the unfolded state.

The folding region FA of the display device ED may be folded around an imaginary folding axis (hereinafter referred to as the folding axis) extending one direction. In an embodiment, for example, as illustrated in FIGS. 2A to 2C, the display device ED may be folded around a folding axis FX extending in the first direction DR1. The folding axis FX may extend in a direction parallel to each of long sides of the display device ED. However, an embodiment of the invention is not limited thereto, and alternatively, the folding axis FX may extend in a direction parallel to each of short sides of the display device ED.

Referring to FIGS. 2A and 2C, the folding axis FX may be defined on the front surface of the display device ED. In the display device ED folded around the folding axis FX, portions of the display surface DS (see FIG. 1), which correspond to the first and second non-folding regions NFA1 and NFA2, respectively, may face each other. That is, portions of the rear surface of the display device ED, which correspond to the first and second non-folding regions NFA1 and NFA2, respectively, may oppose each other and be exposed toward the outside. In such an embodiment, when the display device ED is in a folded state, a portion of the display surface DS (see FIG. 1), which corresponds to the folding region FA, may be folded while forming a curved surface that is concavely bent. The display device ED in each of FIGS. 2A and 2C may be defined as the in-folding display device ED.

Referring to FIG. 2B, the folding axis FX may be defined on the rear surface of the display device ED. In the display device ED folded around the folding axis FX, portions of the display surface DS, which correspond to the first and second non-folding regions NFA1 and NFA2, respectively, may oppose each other and be exposed to the outside. That is, portions of the rear surface of the display device ED, which correspond to the first and the second non-folding regions NFA1 and NFA2, respectively, may face each other. In such an embodiment, when the display device ED in a folded state, a portion of the display surface DS, which corresponds to the folding region FA, may be folded while forming a curved surface that is convexly bent. The display device ED in FIG. 2B may be defined as the out-folding display device ED. As the display surface DS of the out-folding display device ED in a folded state is exposed to the outside, the image IM may be visible to the user even in the folded state.

Referring to FIGS. 2A to 2C, the folding region FA may have a radius of curvature R1 and be folded with predetermined curvature. As illustrated in FIGS. 2A and 2B, a distance DT between the first and second non-folding regions NFA1 and NFA2 may be substantially the same as two times of the radius of curvature R1. However, an embodiment of the invention is not limited thereto, and alternatively, the distance DT between the first and second non-folding regions NFA1 and NFA2 may be less than two times of the radius of curvature R1 as illustrated in FIG. 2C. In such an embodiment, as illustrated in FIG. 2C, the folding region FA may be folded in a dumbbell shape when viewed in the first direction DR1.

The display device ED according to an embodiment may be configured to select only one of an in-folding operation and an out-folding operation with respect to the folding axis FX. However, an embodiment of the invention is not limited thereto, and alternatively, the display device ED may be configured to repeat an operation from an in-folding operation to an out-folding operation, or vice versa. In an embodiment, as shown in FIGS. 2A to 2C, the display device ED may be folded around a single folding axis FX. However, the number of the folding axis FX defined in the display device ED is not limited thereto, and alternatively, the display device ED may be folded around a plurality of folding axes FX, and may include a plurality of folding regions that are spaced apart from each other.

Figure 3:
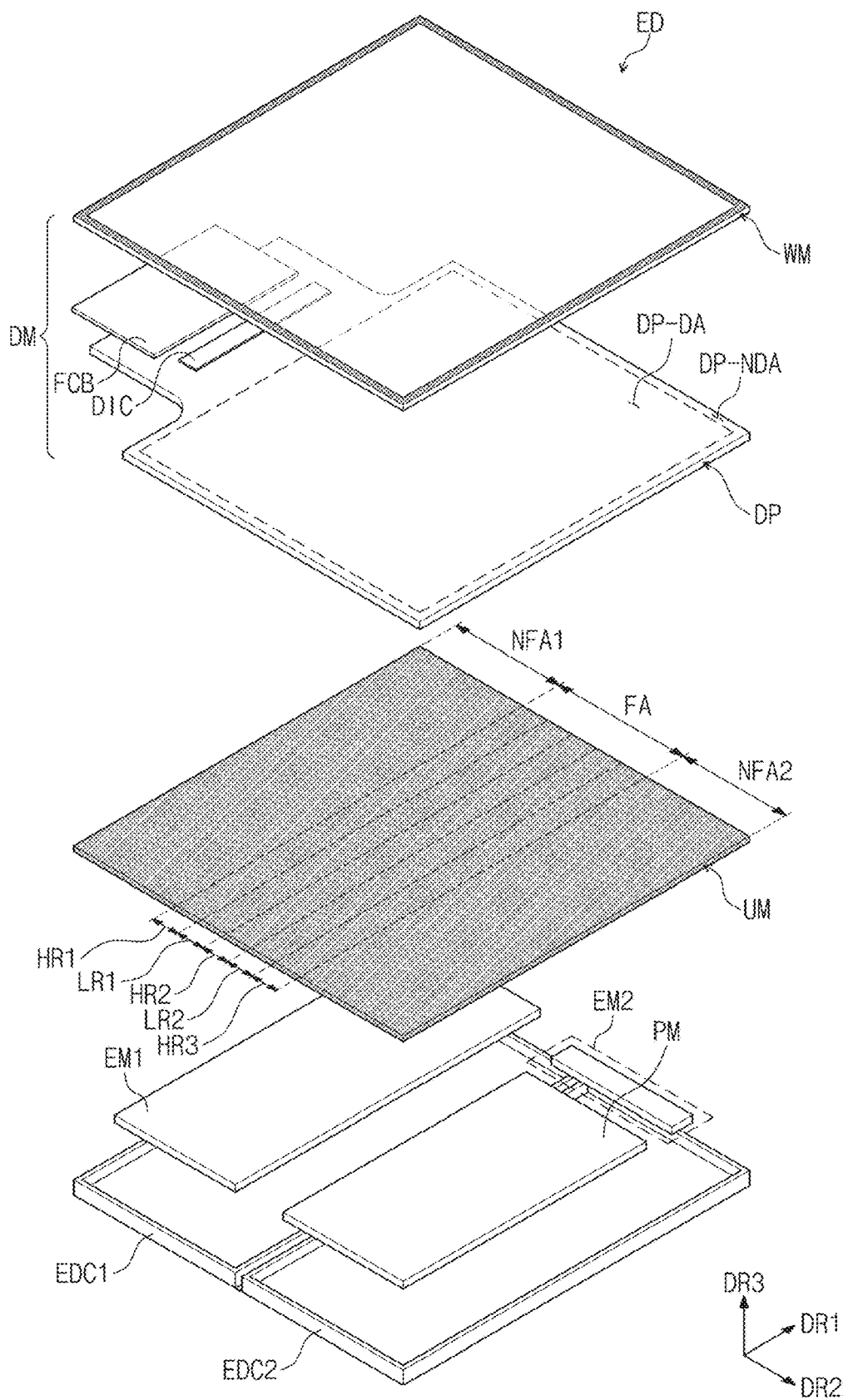
FIG. 3 is an exploded perspective view of a display device according to an embodiment of the invention.

FIG. 3 is an exploded perspective view of a display device ED according to an embodiment of the invention.

Referring to FIG. 3, an embodiment of the display device ED may include a display module DM, a lower member UM, a first electronic module EM1, a second electronic module EM2, a power module PM, and cases EDC1 and EDC2. The display device ED may further include a machine (or mechanical) structure (e.g., hinge structure) for controlling a folding operation of each of the display module DM and the lower member UM.

The display module DM may generate the image IM (see FIG. 1) and detect an external input. The display module DM may include a display panel DP and a window module WM.

The window module WM may provide a front surface of the display device ED. That is, the window module WM may have a front surface that corresponds to the front surface of the display device ED. The window module WM may allow light generated in the display panel DP to pass therethrough and provide a user with the light. The window module WM may be disposed on the display panel DP and protect the display panel DP from an external impact and scratches.

The display module DP may generate the image IM (see FIG. 1) in response to an electrical signal. The display panel DP according to an embodiment may be a light emitting display panel, but is not particularly limited. In an embodiment, for example, the display panel DP may be an organic light emitting display panel, an inorganic light emitting display panel, or a quantum-dot light emitting display panel. An emission layer of the organic light emitting display panel may include an organic luminescent material, and an emission layer of the inorganic light emitting display panel may include an inorganic luminescent material. An emission layer of the quantum-dot light emitting display panel may include a quantum dot, a quantum rod, and so on. Hereinafter, for convenience of description, embodiments where the display panel DP is the organic light emitting display panel will be described.

For convenience of illustration, FIG. 3 illustrates only the display panel DP as a component of the display module DM, which is disposed below the window module WM. However, the display module DM may further include a component disposed above or below the display panel DP. In an embodiment, for example, the display module DM may further include an input sensor stacked above or below the display panel DP. The input sensor may detect an external input applied from the outside of the display device ED and obtain coordinate information of the external input. The input sensor may be driven using various methods, such as a capacitance method, a resistive method, an infrared method or a pressure method, which are not limited to any one.

The display panel DP may include a display region DP-DA in which the image IM (see FIG. 1) is displayed, and a non-display region DP-NDA in which an image is not displayed. The display region DP-DA may correspond to the display part DA (see FIG. 1) of the display device ED, and the non-display region DP-NDA may correspond to the non-display part NDA (see FIG. 1) of the display device ED. In the disclosure, the wording, "a region/portion corresponds to another region/portion" means that the regions/portions overlap each other, and is not limited to the regions/portions having a same area as each other.

The display module DM may include a data driver DIC disposed on the non-display region DP-NDA of the display panel DP. The data driver DIC may include a data driving circuit for driving pixels of the display panel DP. The data driver DIC may be manufactured in the form of an integrated circuit chip and mounted in the non-display region DP-NDA of the display panel DP. The display module DM may further include a circuit board FCB electrically connected to the display panel DP on the non-display region DP-NDA. FIG. 3 illustrates an embodiment where the data driver DIC is disposed in the display panel DP as an example. However, an embodiment of the invention is not limited thereto, and alternatively, the data driver DIC may be mounted in the circuit board FCB.

The lower member UM may be disposed below the display module DM. The lower member UM may absorb an external impact applied toward a rear surface of the display module DM and protect the display module DM. The lower member UM may supplement impact resistance of the flexible display module DM.

The lower member UM may include a folding region FA, a first non-folding region NFA1, and a second non-folding region NFA2, which may correspond to the folding region FA, the first non-folding region NFA1, and the second non-folding region NFA2, respectively, of the display device ED described above with reference to FIG. 1.

The folding region FA of the lower member UM may include one side and the other side, each of which is parallel to the first direction DR1. The one side and the other side of the folding region FA may oppose each other in the second direction DR2. The first non-folding region NFA1 may extend from the one side of the folding region FA. The second non-folding region NFA2 may extend from the other side of the folding region FA.

The lower member UM may include a plurality of high-rigidity parts HR1, HR2 and HR3 and a plurality of low-rigidity parts LR1 and LR2 to correspond to the folding region FA. Each of the high-rigidity parts HR1, HR2 and HR3 may have higher rigidity than each of the low-rigidity parts LR1 and LR2.

The high-rigidity parts HR1, HR2 and HR3 may be defined as portions having relatively high rigidity within a portion of the lower member UM corresponding to the folding region FA. The high-rigidity parts HR1, HR2 and HR3 may include various embodiments to have relatively high rigidity in the folding region FA. In an embodiment, for example, the high-rigidity parts HR1, HR2 and HR3 may each correspond to a portion of a plate layer, in which opening portions are defined or formed to have a small width and length and at a low opening ratio, a portion of the plate layer, in which recessed portions are formed to have a small width and length and to a small degree of recession, a portion of the plate layer, which has a relatively large thickness, a portion containing a material having high rigidity, a portion of a cushion part, which is low in pore density, or the like.

The low-rigidity parts LR1 and LR2 may be defined as portions having relatively low rigidity within the portion of the lower member UM corresponding to the folding region FA. The low-rigidity parts LR1 and LR2 may include various embodiments to have relatively low rigidity within the folding region FA. In an embodiment, for example, the low-rigidity parts LR1 and LR2 may each correspond to a portion of a plate layer, in which opening portions are formed to have a large width and length and at a high opening ratio, a portion of the plate layer, in which recessed portions are formed to have a large width and length and to a large degree of recession, a portion of the plate layer, which has a relatively small thickness, a portion containing a material having low rigidity, a portion of a cushion part, which is high in pore density, or the like.

The high-rigidity parts HR1, HR2 and HR3 may include first to third high-rigidity parts HR1, HR2 and HR3 that are spaced apart from each other. The low-rigidity parts LRT and LR2 may include first and second low-rigidity parts LR1 and LR2 that are spaced apart from each other. The first high-rigidity part HR1, the first low-rigidity part LRT, the second high-rigidity part HR2, the second low-rigidity part LR2, and the third high-rigidity part HR3 may be sequentially arranged in the second direction DR2.

In an embodiment, the second high-rigidity part HR2 may correspond to a middle portion of the folding region FA. In such an embodiment, the second high-rigidity part HR2 may be defined as a middle high-rigidity part. The first high-rigidity part HR1 may correspond to one side of the folding region FA, which is adjacent to the first non-folding region NFA1, and the third high-rigidity part HR3 may correspond to the other side of the folding region FA, which is adjacent to the second non-folding region NFA2. The first low-rigidity part LRT may be disposed between the second high-rigidity part HR2 and the first high-rigidity part HR1, and the second low-rigidity part LR2 may be disposed between the second high-rigidity part HR2 and the third high-rigidity part HR3.

That is, in the portion of the lower member UM corresponding the folding region FA, a portion in the middle and portions at opposing sides may have high rigidity, and a region between the portions having high rigidity may have low rigidity. Accordingly, a curvature or a deformation degree of a crease may be reduced which occurs in the folding region FA of the display device ED, and the crease may be effectively prevented from being visible from the outside of the display device ED. Various embodiments in which the high-rigidity parts HR1, HR2 and HR3 and the low-rigidity parts LR1 and LR2 of the lower member UM are embodied within the folding region FA will be described later in detail.

The power module PM, the first electronic module EM1, and the second electronic module EM2 may be disposed below the lower member UM. The power module PM and the first and second electronic modules EM1 and EM2 may be connected to each other through a separate flexible circuit board.

The power module PM supplies power used for the overall operation of the display device ED. The power module PM may include a typical battery module.

The first electronic module EM1 and the second electronic module EM2 may include various functional modules for operating the display device ED. Each of the first electronic module EM1 and the second electronic module EM2 may be mounted directly in a motherboard electrically connected to the display panel DP, or may be mounted in a separate board and electrically connected to the motherboard through a connector or the like.

The first electronic module EM1 may include a control module, a wireless communication module, an image input module, a sound input module, a sound output module, a memory, an external interface module, or the like.

The second electronic module EM2 may include a camera module, a proximity sensor, a biometric sensor for recognizing a user's body part (e.g., fingerprint, iris or face), a lamp for outputting light, or the like. According to an embodiment, the second electronic module EM2 may receive or output an optical signal through a partial region of the display region DP-DA of the display panel DP. However, an embodiment of the invention is not limited thereto, and the second electronic module EM2 may receive or output the optical signal through a partial region of the non-display region DP-NDA.

The window module WM and the cases EDC1 and EDC2 may be connected to each other to constitute an outer appearance of the display device ED, and may provide an inner space capable of accommodating components of the display device ED. In an embodiment, for example, the cases EDC1 and EDC2 may accommodate the display module DM, the first and second electronic modules EM1 and EM2, and the power module PM, and may protect the accommodated components of the display device ED.

Figure 4:
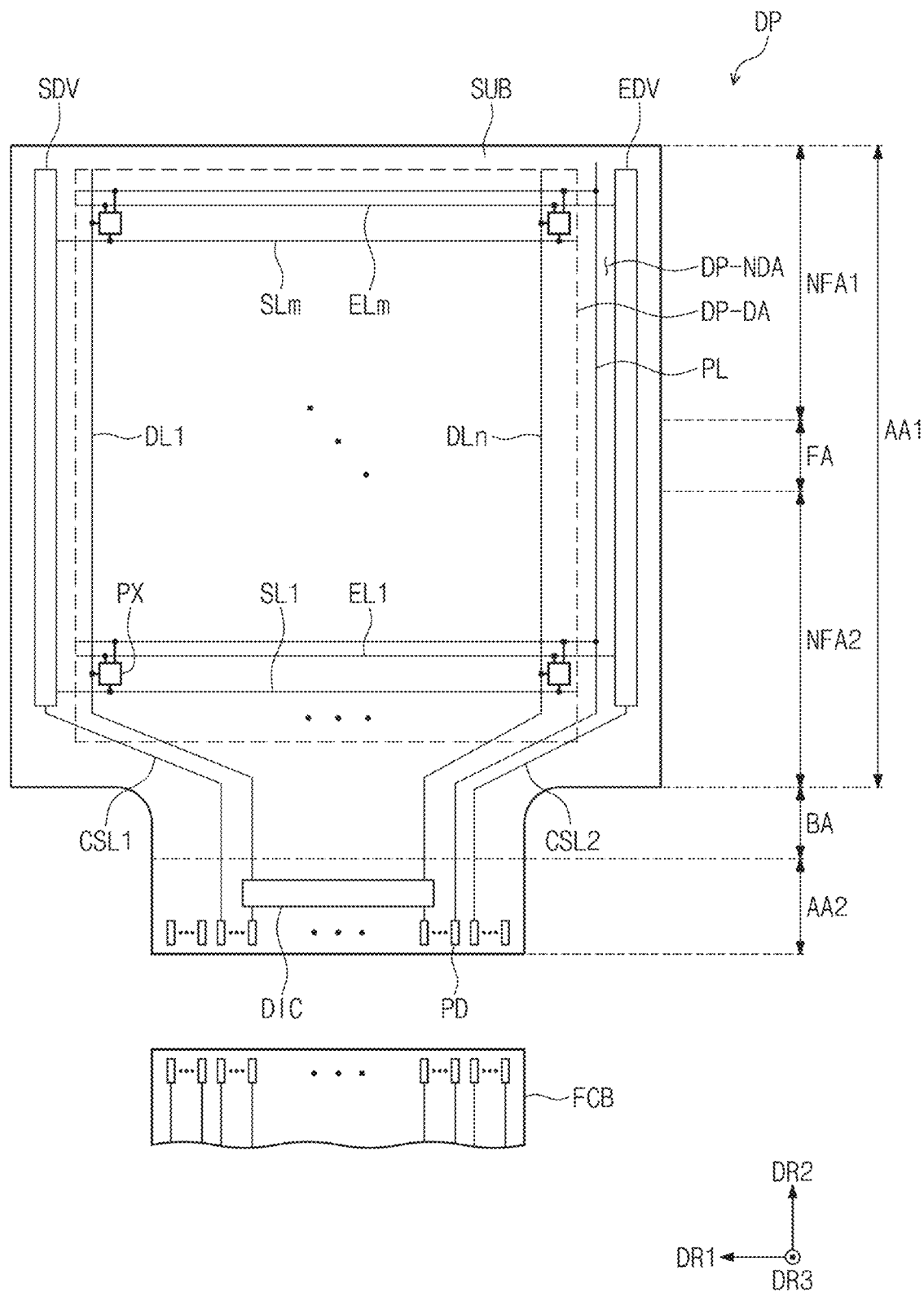
FIG. 4 is a plan view of a display panel according to an embodiment of the invention.

FIG. 4 is a plan view of a display panel DP according to an embodiment of the invention.

Referring to FIG. 4, an embodiment of the display panel DP may include a base substrate SUB, pixels PX, a plurality of signal lines SL1 to SLm, EL1 to Elm, DL1 to DLn, CSL1, CSL2 and PL electrically connected to the pixels PX, a scan driver SDV, a data driver DIC, an emission driver EDV, and a plurality of pads PD. The signal lines SL1 to SLm, EL1 to Elm, DL1 to DLn, CSL1, CSL2 and PL may include scan lines SL1 to SLm, data lines DL1 to DLn, emission lines EL1 to Elm, first and second control lines CSL1 and CSL2, and a power line PL. Here, m and n are natural numbers.

The base substrate SUB may provide a base surface on which elements and wirings of the display panel DP are disposed. The base substrate SUB may include a display region DP-DA and a non-display region DP-NDA. The display region DP-DA may be a region in which an image is display by the pixels PX, and the non-display region DP-NDA may be a region which is disposed adjacent to the display region DP-DA and in which elements or wirings for driving the pixels PX are disposed.

The base substrate SUB may be a substrate having flexibility. The base substrate SUB may include a first panel region AA1, a second panel region AA2, and a bending region BA. The bending region BA may be disposed between the first panel region AA1 and the second panel region AA2, and the first panel region AA1, the bending region BA, and the second panel region AA2 may be arranged in the second direction DR2. However, the shape of the base substrate SUB on a plan view is not limited to the illustrated shape, and may be variously changed or modified based on the structure of the display device ED (see FIG. 1).

The first panel region AA1 may include the display region DP-DA. The remaining first panel region AA1 excluding the display region DP-DA, the bending region BA, and the second panel region AA2 may correspond to the non-display region DP-NDA.

The first panel region AA1 may include a first non-folding region NFA1, a folding region FA, and a second non-folding region NFA2. Thus, the first panel region AA1 of the display panel DP may be folded or foldable around a folding axis corresponding to folding of the display device ED.

The bending region BA may be a region that is bent with predetermined curvature as the display panel DP is accommodated in the cases EDC1 and EDC2 (see FIG. 3). The bending region BA may be bent around a bending axis extending in the first direction DR1 so that the second panel region AA2 faces a rear surface of the first panel region AA1. As the bending region BA is bent, the first panel region AA1 and the second panel region AA2 may overlap each other on a plan view. A width of the bending region BA may be less than a width of the first panel region AA1 in the first direction DR1 and accordingly, the bending region BA may be easily bent. However, an embodiment is not necessarily limited thereto.

Each of the pixels PX may include a pixel driving circuit, which is constituted by transistors (e.g., a switching transistor, a driving transistor, etc.) and a capacitor, and a light emitting element connected to the pixel driving circuit. Each of the pixels PX may emit light in response to an electrical signal applied to the pixel PX. The pixels PX may be disposed in the display region DP-DA. In an embodiment, some of the pixels PX may include a transistor disposed in the non-display region DP-NDA, and is not limited to any one embodiment.

The scan driver SDV, the data driver DIC, and the emission driver EDV may be disposed in the non-display region DP-NDA. In an embodiment, the scan driver SDV and the emission driver EDV may be disposed in the first panel region AA1, and the data driver DIC may be disposed in the second panel region AA2. However, an embodiment of the invention is not limited thereto. In an embodiment, at least one selected from the scan driver SDV, the data driver DIC, or the emission driver EDV may overlap the display region DP-DA and accordingly, the display panel DP in which the area of the non-display region DP-NDA is decreased may be achieved.

Each of the pixels PX may be connected to a corresponding scan line, data line, and emission line among the scan lines SL1 to SLm, the data lines DL1 to DLn, and the emission lines EL1 to Elm. According to the configuration of the pixel driving circuit of the pixels PX, other types of signal lines may be additionally provided in the display panel DP.

The scan lines SL1 to SLm may extend in the first direction DR1 and be electrically connected to the scan driver SDV. The data lines DL1 to DLn may extend in the second direction DR2 and be electrically connected to the data driver DIC. The emission lines EL1 to Elm may extend in the first direction DR1 and be electrically connected to the emission driver EDV.

The power line PL may include a portion extending in the first direction DR1 and a portion extending in the second direction DR2. In the power line PL, the portion extending in the first direction DR1 and the portion extending in the second direction DR2 may be disposed on different layers. However, an embodiment of the invention is not limited thereto, and the portion extending in the first direction DR1 and the portion extending in the second direction DR2 may be provided as one body on the same layer, that is, integrally formed as a single unitary and indivisible part in a same layer. In the power line PL, the portion extending in the second direction DR2 may extend from the first panel region AAT through the bending region BA to the second panel region AA2. The power line PL may receive a driving voltage and provide the pixels PX with the driving voltage.

The first control line CSL1 may be electrically connected to the scan driver SDV and extend toward a lower end of the second panel region AA2 through the bending region BA. The second control line CSL2 may be electrically connected to the emission driver EDV and extend toward the lower end of the second panel region AA2 through the bending region BA.

The pads PD may be disposed adjacent to the lower end of the second panel region AA2. The pads PD may be disposed more adjacent to a lower end of the display panel DP than the data driver DIC is. The pads PD may be arranged in the first direction DR1. The pads PD may be parts connected to the circuit board FCB. The circuit board FCB may include a timing controller for controlling an operation of each of the scan driver SDV, the data driver DIC, and the emission driver EDV, and a voltage generator for generating a voltage, and may be electrically connected to the display panel DP through the pads PD.

Each of the pads PD may be electrically connected to a corresponding signal line. In an embodiment, for example, the power line PL and the first and second control lines CSL1 and CSL2 may be connected to corresponding pads PD, respectively. The data lines DL1 to DLn may be connected to corresponding pads PD, respectively, through the data driver DIC.

The scan driver SDV may generate scan signals in response to the scan control signal. The scan signals may be applied to the pixels PX through the scan lines SL1 to SLm. The data driver DIC may generate data voltages corresponding to image signals in response to a data control signal. The data voltages may be applied to the pixels PX through the data lines DL1 to DLn. The emission driver EDV may generate emission signals in response to an emission control signal. The emission signals may be applied to the pixels PX through the emission lines EL1 to Elm.

The pixels PX may be provided with the data voltages in response to the scan signals. The pixels PX may display an image by emitting light with brightness corresponding to the data voltages in response to emission signals. An emission time of the pixels PX may be controlled by the emission signals. Thus, the display panel DP may generate the image in the display region DP-DA through the pixels PX.

Figure 5:
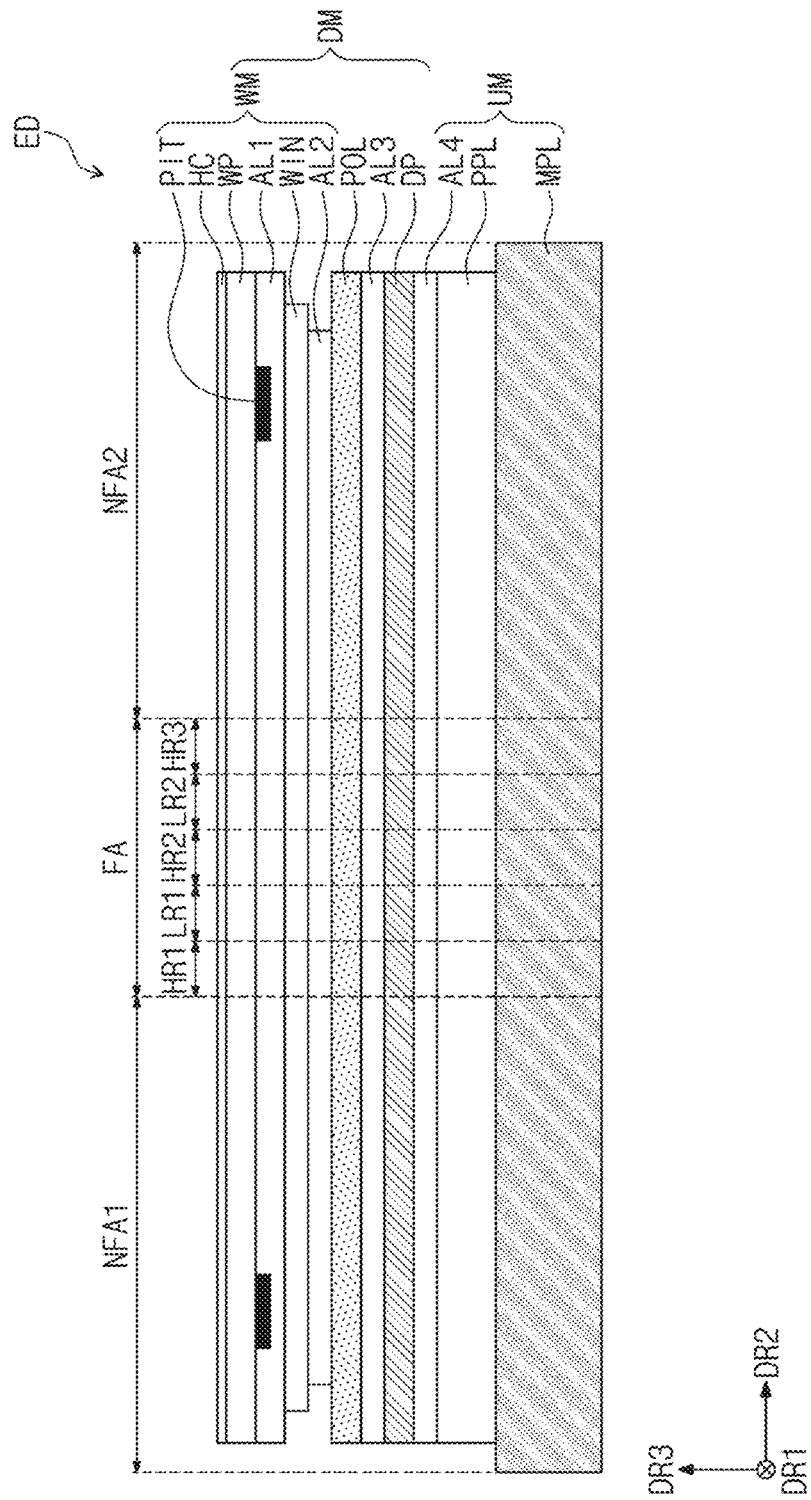
FIG. 5 is a cross-sectional view of a display device according to an embodiment of the invention.

FIG. 5 is a cross-sectional view of a display device ED according to an embodiment of the invention. FIG. 5 schematically illustrates a cross section of a display module DM and a lower member UM among components of an embodiment of the display device ED.

Referring to FIG. 5, an embodiment of the display module DM may include a display panel DP, an anti-reflective layer POL, and a window module WM. The descriptions or features of the same or like elements described above may apply to those of the components of the display device ED illustrated in FIG. 5.

The window module WM may be disposed on the display panel DP and the anti-reflective layer POL and protect the display panel DP and the anti-reflective layer POL. The window module WM may correspond to the folding of the display panel DP and be folded or foldable together with the display panel DP. The window module WM may include a window WIN, a window protective layer WP, a hard coating layer HC, a bezel pattern PIT, and adhesive layers AL1 and AL2.

The window WIN may be disposed on the display panel DP. The window WIN may protect the display panel DP from external scratches. The window WIN may include an optically transparent material. In an embodiment, for example, the window WIN may include a glass or synthetic resin film. The window WIN may have a single-layer structure or a multilayer structure. In an embodiment, for example, the window WIN having a multilayer structure may include synthetic resin films bonded to each other through an adhesive or include a glass film and a synthetic resin film, which are bonded to each other through an adhesive.

The window protective layer WP may be disposed on the window WIN. The window protective layer WP may include an organic matter. In an embodiment, for example, the window protective layer WP may include at least one of polyimide, polycarbonate, polyamide, triacetylcellulose, polymethylmethacrylate, or polyethylene terephthalate. However, the material of the window protective layer WP is not limited to the examples above.

The hard coating layer HC may be disposed on the window protective layer WP. The hard coating layer HC may reinforce the rigidity of the window module WM and provide a flat top surface. The hard coating layer HC may further include a functional layer such as an anti-fingerprint layer and an antistatic layer.

The bezel pattern PIT may be disposed on a bottom surface of the window protective layer WP. However, an embodiment of the invention is not limited thereto, and the bezel pattern PIT may be disposed on a top surface of the window WIN or a bottom surface of the window WIN. The bezel pattern PIT may be formed through a process such as coating or printing. A region in which the bezel pattern PIT is disposed may correspond to the non-display part NDA (see FIG. 1) of the display device ED described above. The bezel pattern PIT may include a colored light-shielding film. The bezel pattern PIT may effectively prevent components of the display panel DP, which are disposed to overlap the bezel pattern PIT, from being visible from the outside.

The first adhesive layer AL1 may be disposed between the window WIN and the window protective layer WP and couple the window WIN and the window protective layer WP to each other. The first adhesive layer AL1 may cover the bezel pattern PIT. The second adhesive layer AL2 may be disposed on a bottom surface of the window WIN and couple the window WIN and the anti-reflective layer POL to each other.

The anti-reflective layer POL may be disposed on the display panel DP. The anti-reflective layer POL may reduce the reflectance of external light incident into the display panel DP. In an embodiment, the anti-reflective layer POL may include a polarizing film. The polarizing film may include a retarder and/or a polarizer.

The anti-reflective layer POL may include a protective film that absorbs an external impact applied from an upper portion of the display device ED toward the display panel DP and protects the display panel DP. In an embodiment, for example, the anti-reflective layer POL may include a polarizing film or a protective film, or a polarizing film and a protective film that are stacked in sequence.

In an alternative embodiment, the anti-reflective layer POL may include color filters having a predetermined arrangement. In an embodiment, for example, the color filters may be arranged to correspond to emission colors of the pixels included in the display panel DP. The color filters may filter external light so as for the filtered external light to have the emission colors of pixels corresponding to the color filters, thereby reducing the reflectance of the external light. The anti-reflective layer POL may further include a black matrix adjacent to the color filters.

The anti-reflective layer POL may be coupled to the display panel DP through a third adhesive layer AL3 disposed between the display panel DP and the anti-reflective layer POL. However, an embodiment of the invention is not limited thereto. The third adhesive layer AL3 may be omitted and the anti-reflective layer POL may be disposed directly on the display panel DP.

The lower member UM may be disposed on a rear surface of the display panel DP. The lower member UM may include a fourth adhesive layer AL4, a protective layer PPL and a plate layer MPL.

In an embodiment, as described above, the lower member UM may include high-rigidity parts HR1, HR2 and HR3 and low-rigidity parts LR1 and LR2. In the lower member UM, at least some of components (e.g., the fourth adhesive layer AL4, the protective layer PPL or the plate layer MPL), which constitute the lower member UM, may have relatively different rigidity in a folding region FA to embody the high-rigidity parts HR1, HR2 and HR3 and the low-rigidity parts LR1 and LR2. In an embodiment, for example, at least one of the fourth adhesive layer AL4, the protective layer PPL, or the plate layer MPL may include portions having different rigidities within the folding region FA.

Each of the first to fourth adhesive layers AL1 to AL4 may include a transparent adhesive such as a pressure sensitive adhesive (PSA) or an optically clear adhesive (OCA). However, the type of the adhesive is not limited thereto.

The protective layer PPL may be coupled to the display panel DP through the fourth adhesive layer AL4 disposed between the protective layer PPL and the display panel DP. The protective layer PPL may be disposed on the rear surface of the display panel DP and protect a lower portion of the display panel DP. The protective layer PPL may effectively prevent scratches from occurring in the rear surface of the display panel DP during manufacture of the display panel DP. The protective layer PPL may absorb an external impact applied toward the rear surface of the display panel DP. The protective layer PPL may include at least one of a synthetic resin layer or a cushion layer, which protects the display panel DP.

The synthetic resin layer of the protective layer PPL may include a polymer material. In an embodiment, for example, the synthetic resin layer of the protective layer PPL may include at least one of polyamide or polyethylene terephthalate. However, the material of the synthetic resin layer of the protective layer PPL is not limited to the examples above.

The cushion layer of the protective layer PPL may have a porous structure having elasticity. In an embodiment, for example, the cushion layer of the protective layer PPL may include synthetic resin foam. The synthetic resin foam may include acrylonitrile butadiene styrene copolymer (ABS) foam, polyurethane (PU) foam, polyethylene (PE) foam, ethylene vinyl acetate (EVA) foam, or polyvinyl chloride (PVC) foam. However, the material of the cushion layer of the protective layer PPL is not limited to the examples above.

The plate layer MPL may include a material having rigidity. The plate layer MPL may include a material having high resistance to a compressive force such as an external pressing. The plate layer MPL may support the display panel DP and may improve impact resistance of the lower member UM to prevent deformation of the display panel DP, which is caused by repeated folding. In an embodiment, for example, the plate layer MPL may include a metal material such as stainless steel. However, an embodiment of the invention is not limited thereto, and the plate layer MPL may include a reinforced fiber composite material such as carbon fiber reinforced plastic (CFRP) or glass fiber reinforced plastic (GFRP).

The stacked components of the display device ED illustrated in FIG. 5 are just one example, and an additional component may be further disposed in the display device ED. In an embodiment, for example, an input sensor may be further disposed between the display panel DP and the anti-reflective layer POL, or a heat dissipating layer, a light shielding layer, a digitizer, a step compensation layer, or the like, may be further disposed below the lower member UM. However, an embodiment of the invention is not limited thereto, and some components of the display device ED illustrated in FIG. 5 may be stacked in different order or one or more components of the display device ED may be omitted.

Figure 6A:
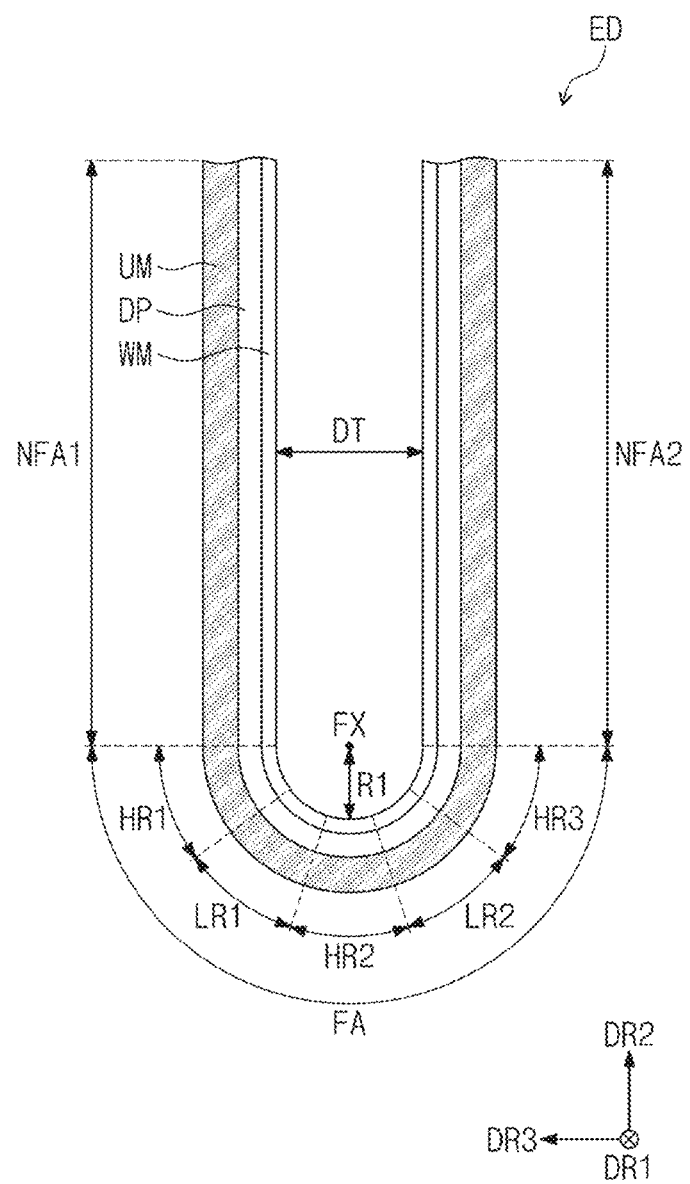
FIGS. 6A and 6B are cross-sectional views of a display device in a folded state according to an embodiment of the invention.
Figure 6B:
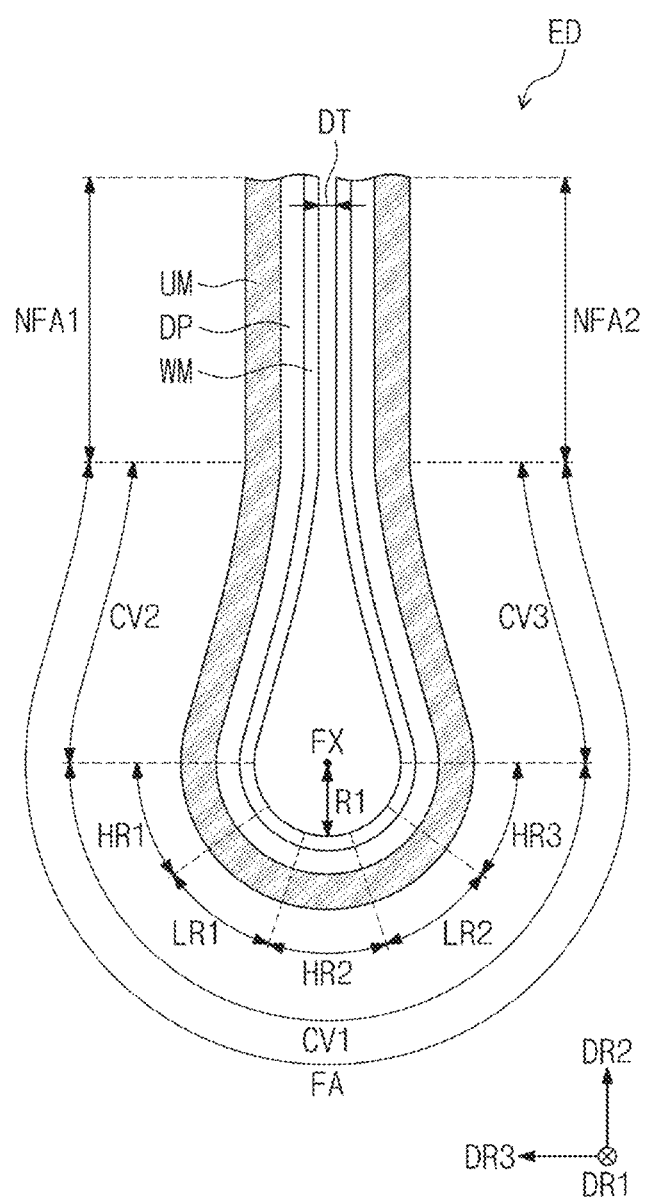

FIGS. 6A and 6B are cross-sectional views of a display device ED according to an embodiment of the invention. For convenience of illustration, FIGS. 6A and 6B schematically illustrate cross sections of a window module WM, a display panel DP and a lower member UM among components of the display device ED. FIGS. 6A and 6B illustrate cross sections of the display device ED in a folded state when viewed in the first direction DR1.

Referring to FIG. 6A, a folding region FA of the display device ED may have a middle portion that has a first radius of curvature R1 and is folded around a folding axis FX parallel to the first direction DR1. When the display device ED is in in a folded state, a distance DT between a first non-folding region NFA1 and a second non-folding region NFA2 may be substantially the same as two times of the first radius of curvature R1. The embodiment of the display device ED illustrated in FIG. 6A may correspond to the display device ED illustrated in FIG. 2A.

The window module WM, the display panel DP, and the lower member UM may each include the first non-folding region NFA1, the folding region FA, and the second non-folding region NFA2. As the display module ED is folded, the window module WM, the display panel DP, and the lower member UM may be folded together.

The folding region FA of the lower member UM may have lower or less rigidity than each of the first non-folding region NFA1 and the second non-folding region NFA2 of the lower member UM. Accordingly, the folding region FA of the lower member UM may be easily folded with predetermined curvature. The folding region FA and the first and second non-folding regions NFA1 and NFA2 of the lower member UM may be provided as one body or integrally formed as a single unitary and indivisible part. However, an embodiment is not necessarily limited thereto.

The folding region FA of the lower member UM may include a first high-rigidity part HR1, a first low-rigidity part LR1, a second high-rigidity part HR2, a second low-rigidity part LR2, and a third high-rigidity part HR3 that are arranged in one direction. The second high-rigidity part HR2 may correspond to a middle portion of the folding region FA. The first high-rigidity part HR1 may correspond to a left portion of the folding region FA. The third high-rigidity part HR3 may correspond to a right portion of the folding region FA. The first low-rigidity part LR1 may be disposed between the first high-rigidity part HR1 and the second high-rigidity part HR2, and the second low-rigidity part LR2 may be disposed between the second high-rigidity part HR2 and the third high-rigidity part HR3. The high-rigidity parts HR1, HR2 and HR3 and the low-rigidity parts LR1 and LR2 of the lower member UM may be provided as one body or integrally formed as a single unitary and indivisible part. However, an embodiment is not necessarily limited thereto.

Each of the first to third high-rigidity parts HR1, HR2 and HR3 of the lower member UM may have a less modulus than each of the first non-folding region NFA1 or the second non-folding region NFA2 of the lower member UM. However, an embodiment is not necessarily limited thereto. The first low-rigidity part LR1 may have a less or lower modulus than each of the first high-rigidity part HR1 and the second high-rigidity part HR2 that are adjacent to the first low-rigidity part LRT. The second low-rigidity part LR2 may have a less modulus than each of the second high-rigidity part HR2 and the third high-rigidity part HR3 that are adjacent to the second low-rigidity part LR2.

As the middle portion, the left portion, and the right portion have relatively high rigidity in the folding region FA of the lower member UM, the folding region FA of the lower member UM may be folded to approach substantially constant curvature. Accordingly, the maximum strain at the middle portion of the folding region FA of the lower member UM may be reduced. That is, a degree to which plastic deformation occurs in the folding region FA of the lower member UM may be reduced. Accordingly, the curvature of a crease or a deformation degree of the crease may be reduced which occurs in the folding region FA of the display device ED.

Referring to FIG. 6B, the middle portion of the folding region FA of the display device ED may have a first radius of curvature R1 and be folded around a folding axis FX parallel to the first direction DR1. A distance DT between a first non-folding region NFA1 and a second non-folding region NFA2 of the display device ED in a folded state may be less than two times of the first radius of curvature R1. The embodiment of the display device ED in illustrated in FIG. 6B may correspond to the display device ED illustrated in FIG. 2C.

As the folding region FA is folded in a way such that the distance DT between the first non-folding region NFA1 and the second non-folding region NFA2 is less than two times of the first radius of curvature R1, the folding region FA of the window module WM, the display panel DP, and the lower member UM may include a first curvature part CV1, a second curvature part CV2, and a third curvature part CV3. As the display device ED is folded, the window module WM, the display panel DP, and the lower member UM may be folded together while having the first to third curvature parts CV1, CV2 and CV3 in the folding region FA.

The first curvature part CV1 may correspond to a middle portion of the folding region FA. The second curvature part CV2 may be a portion extending from one side of the first curvature part CV1, which is parallel to the first direction DR1, to the first non-folding region NFA1. The third curvature part CV3 may be a portion extending from the other side of the first curvature part CV1, which is parallel to the first direction DR1, to the second non-folding region NFA2. That is, the second curvature part CV2, the first curvature part CV1, and the third curvature part CV3 may be arranged in sequence in one direction in anon-folded state of the display device ED.

The first curvature part CV1 may include a curved surface that is bent from a center of curvature, which is defined on a front surface of the display device ED, to have the first radius of curvature R1. The first curvature part CV1 may be bent convexly in a direction from the front surface toward a rear surface of the display device ED.

Each of the second curvature part CV2 and the third curvature part CV3 may be bent opposite to the first curvature part CV1. That is, the second curvature part CV2 may include a curved surface that is bent from a center of curvature, which is defined on the rear surface of the display device ED, to have a second radius of curvature, and the third curvature part CV3 may include a curved surface that is bent from the center of curvature, which is defined on the rear surface of the display device ED, to have a third radius of curvature. Accordingly, each of the second curvature part CV2 and the third curvature part CV3 may be bent concavely in the direction from the front surface toward the rear surface of the display device ED. That is, the second curvature part CV2 and the third curvature part CV3 may be bent to face each other. Accordingly, the display device ED may be folded in a dumbbell shape.

The second curvature part CV2 and the third curvature part CV3 may have a symmetrical shape with the first curvature part CV1 therebetween. Thus, the second radius of curvature and the third radius of curvature may have substantially a same magnitude or value as each other. That is, the second curvature part CV2 and the third curvature part CV3 may include the curved surfaces, respectively, which have the same curvature magnitude or value as each other.

The curved surface of the first curvature part CV1 may have a greater curvature than the curved surface of each of the second and third curvature parts CV2 and CV3. Accordingly, the strain may be greatest at a central portion of the first curvature part CV1.

The lower member UM may include high-rigidity parts HR1, HR2 and HR3 and low-rigidity parts LR1 and LR2 to correspond to the first curvature part CV1. That is, the second high-rigidity part HR2 may correspond to a middle portion of the first curvature part CV1. The first high-rigidity part HR1 may correspond to one side of the first curvature part CV1, and the third high-rigidity part HR3 may correspond to the other side of the first curvature part CV1. In an embodiment, for example, the first high-rigidity part HR1 may correspond to a left portion of the first curvature part CV1, and the third high-rigidity part HR3 may correspond to a right portion of the first curvature part CV1.

The first low-rigidity part LRT may be disposed between the first high-rigidity part HR1 and the second high-rigidity part HR2, and the second low-rigidity part LR2 may be disposed between the second high-rigidity part HR2 and the third high-rigidity part HR3. Thus, in a region corresponding to the first curvature part CV1, the lower member UM may include the first high-rigidity part HR1, the first low-rigidity part LR1, the second high-rigidity part HR2, the second low-rigidity part LR2, and the third high-rigidity part HR3 that are arranged in sequence in one direction.

As the middle portion, the left portion, and the right portion of the lower member UM have relatively high rigidity to correspond to the first curvature part CV1 bent with the greatest curvature, the first curvature part CV1 may be folded to approach constant curvature. Accordingly, the maximum strain at the middle portion of the first curvature part CV1 may be reduced, and a degree to which plastic deformation occurs in the first curvature part CV1 may be reduced.

Figure 7:
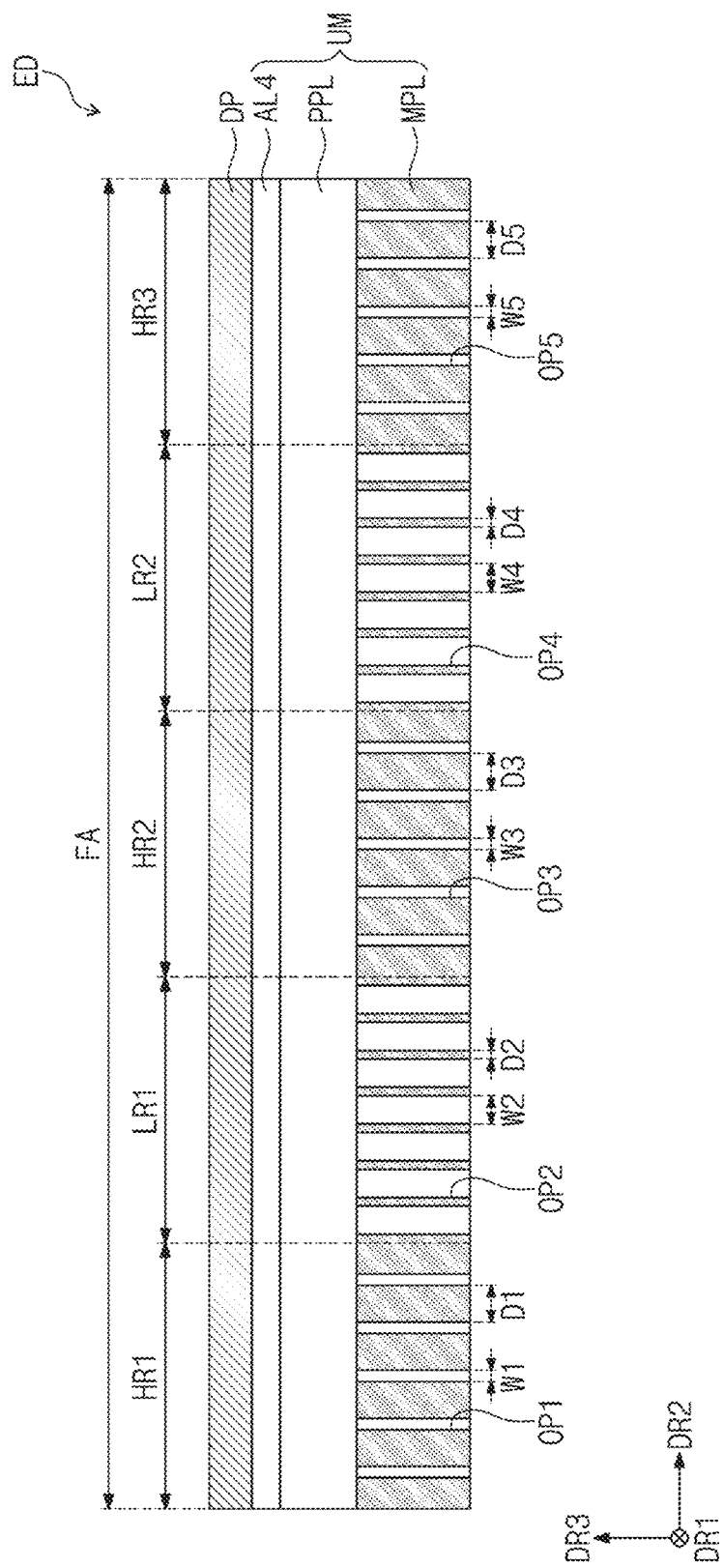
FIG. 7 is a cross-sectional view of a display device according to an embodiment of the invention.

FIG. 7 is a cross-sectional view of a display device ED according to an embodiment of the invention. FIGS. 8A to 8D are plan views of a plate layer MPL according to an embodiment of the invention. FIG. 7 illustrates a cross section of the display device ED corresponding to a folding region FA. FIGS. 8A to 8D illustrate plan views of the plate layer MPL corresponding to the folding region FA.

Referring to FIG. 7, a plurality of opening portions OP1 to OP5 corresponding to the folding region FA may be defined in a plate layer MPL of a lower member UM. The opening portions OP1 to OP5 may be defined or formed through the plate layer MPL in the third direction DR3. The plate layer MPL and the lower member UM including the plate layer MPL may have flexibility improved in the folding region FA by the opening portions OP1 to OP5.

As the opening portions OP1 to OP5 are arranged within the plate layer MPL corresponding to the folding region FA, high-rigidity parts HR1, HR2 and HR3 and low-rigidity parts LR1 and LR2 may be embodied or defined in the lower member UM. The plate layer MPL may include a first high-rigidity portion, a first low-rigidity portion, a second high-rigidity portion, a second low-rigidity portion, and a third high-rigidity portion, which are arranged in the second direction DR2 and correspond to the first high-rigidity part HR1, the first low-rigidity part LR1, the second high-rigidity part HR2, the second low-rigidity part LR2, and the third high-rigidity part HR3, respectively. Hereinafter, for convenience of description, the high-rigidity portions and the low-rigidity portions of the plate layer MPL will be described using the same reference numbers or symbols for the corresponding high-rigidity parts and low-rigidity parts, respectively.

The high-rigidity portions HR1, HR2 and HR3 and the low-rigidity portions LR1 and LR2 of the plate layer MPL may be provided as one body or integrally formed as a single unitary and indivisible part. In an embodiment, for example, the high-rigidity portions HR1, HR2 and HR3 and the low-rigidity portions LR1 and LR2 of the plate layer MPL may be formed by defining the opening portions OP1 to OP5 inside a single plate.

First opening portions OP1 may be defined in the first high-rigidity portion HR1 of the plate layer MPL. The first opening portions OP1 may be spaced apart from each other in the second direction DR2. Each of the first opening portions OP1 may have a first width W1 in the second direction DR2, and the first opening portions OP1 may be spaced a first gap D1 from each other in the second direction DR2.

Second opening portions OP2 may be defined in the first low-rigidity part LR1 of the plate layer MPL. The second opening portions OP2 may be spaced apart from each other in the second direction DR2. Each of the second opening portions OP2 may have a second width W2 in the second direction DR2, and the second opening portions OP2 may be spaced a second gap D2 from each other in the second direction DR2.

Third opening portions OP3 may be defined in the second high-rigidity part HR2 of the plate layer MPL. The third opening portions OP3 may be spaced apart from each other in the second direction DR2. Each of the third opening portions OP3 may have a third width W3 in the second direction DR2, and the third opening portions OP3 may be spaced a third gap D3 from each other in the second direction DR2.

Fourth opening portions OP4 may be defined in the second low-rigidity part LR2 of the plate layer MPL. The fourth opening portions OP4 may be spaced apart from each other in the second direction DR2. Each of the fourth opening portions OP4 may have a fourth width W4 in the second direction DR2, and the fourth opening portions OP4 may be spaced a fourth gap D4 from each other in the second direction DR2.

Fifth opening portions OP5 may be defined in the third high-rigidity part HR3 of the plate layer MPL. The fifth opening portions OP5 may be spaced apart from each other in the second direction DR2. Each of the fifth opening portions OP5 may have a fifth width W5 in the second direction DR2, and the fifth opening portions OP5 may be spaced a fifth gap D5 from each other in the second direction DR2.

In one region of the plate layer MPL, as an aperture or opening ratio is higher, modulus may decrease. In an embodiment, for example, as the width of each of the opening portions defined in the one region of the plate layer MPL is larger or greater, or as the gap between the opening portions is smaller or less, the modulus of the one region of the plate layer MPL may decrease.

The first low-rigidity portion LR1 may have a less modulus than each of the first high-rigidity portion HR1 and the second high-rigidity portion HR2. In an embodiment, for example, an aperture or opening ratio of the first low-rigidity portion LR1 may be higher than an aperture or opening ratio of each of the first high-rigidity portion HR1 and the second high-rigidity portion HR2. The second width W2 of the second opening portion OP2 may be greater than each of the first width W1 of the first opening portion OP1 and the third width W3 of the third opening portion OP3. The second gap D2 may be smaller than each of the first gap D1 and the third gap D3.

However, an embodiment of the invention is not limited thereto. The second width W2 may be the same as each of the first width W1 and the third width W3, and the second gap D2 may be less than each of the first gap D1 and the third gap D3. Alternatively, the second gap D2 may be the same as each of the first gap D1 and the third gap D3, and the second width W2 may be greater than each of the first width W1 and the third width W3. An embodiment is not limited to any one as long as the first low-rigidity portion LR1 has the higher aperture or opening ratio than each of the first high-rigidity portion HR1 and the second high-rigidity portion HR2.

The modulus of the first high-rigidity portion HR1 may be substantially the same as the modulus of the second high-rigidity portion HR2. In an embodiment, for example, the first width W1 of the first opening portion OP1 and the third width W3 of the third opening portion OP3 may be the same as each other, and the first gap D1 and the third gap D3 may be the same as each other. However, an embodiment is not limited thereto, and the modulus of the first high-rigidity portion HR1 may be different from the modulus of the second high-rigidity portion HR2. An embodiment is not limited to any one as long as each of the first high-rigidity portion HR1 and the second high-rigidity portion HR2 has the greater modulus than the first low-rigidity portion LR1.

The description or features of the first high-rigidity portion HR1, the first low-rigidity portion LR1, and the second high-rigidity portion HR2 may similarly apply to the second high-rigidity portion HR2, the second low-rigidity portion LR2, and the third high-rigidity portion HR3. The second low-rigidity portion LR2 may have a less modulus than each of the second high-rigidity portion HR2 and the third high-rigidity portion HR3. In an embodiment, for example, the fourth width W4 of the fourth opening portion OP4 may be greater than each of the third width W3 of the third opening portion OP3 and the fifth width W5 of the fifth opening portion OP5. The fourth gap D4 may be smaller or less than each of the third gap D3 and the fifth gap D5. However, an embodiment is not limited to any one as long as an aperture or opening ratio of the second low-rigidity portion LR2 may be higher than an aperture or opening ratio of each of the second high-rigidity portion HR2 and the third high-rigidity portion HR3.

The modulus of the first low-rigidity portion LRT may be substantially the same as the modulus of the second low-rigidity portion LR2. In an embodiment, for example, the first low-rigidity portion LRT and the second low-rigidity portion LR2 may be symmetrical with respect to the second high-rigidity portion HR2. The second width W2 of the second opening portion OP2 may be the same as the fourth width W4 of the fourth opening portion OP4, and the second gap D2 may be the same as the fourth gap D4.

However, an embodiment of the invention is not limited thereto. The modulus of the first low-rigidity portion LRT and the modulus of the second low-rigidity portion LR2 may be substantially the same as each other, but arrangement of the second opening portions OP2 and arrangement of the fourth opening portions OP4 may be different from each other. Alternatively, the modulus of the first low-rigidity portion LRT and the modulus of the second low-rigidity portion LR2 may be different from each other. An embodiment is not limited to any one as long as each of the first low-rigidity portion LRT and the second low-rigidity portion LR2 has a less modulus than adjacent high-rigidity portions among the high-rigidity portions HR1, HR2 and HR3.

The modulus of the third high-rigidity part HR3 may be substantially the same as the modulus of the first high-rigidity part HR1. In an embodiment, for example, the first high-rigidity part HR1 and the third high-rigidity part HR3 may be symmetrical with respect to the second high-rigidity portion HR2. The fifth width W5 of the fifth opening portion OP5 may be the same as the first width W1 of the first opening portion OP1, and the fifth gap D5 may be the same as the first gap D1. However, an embodiment of the invention is not limited thereto. The modulus of the first high-rigidity portion HR1 and the modulus of the third high-rigidity portion HR3 may be the same as each other, but arrangement of the first opening portions OP1 and arrangement of the fifth opening portions OP5 may be different from each other.

In an embodiment, the respective moduli of the first to third high-rigidity portions HR1, HR2 and HR3 may be the same as each other. However, an embodiment of the invention is not limited thereto, and some of the first to third high-rigidity portions HR1, HR2 and HR3 may have different moduli. In an embodiment, for example, the first and third high-rigidity portions HR1 and HR3 may have the same modulus, and the first high-rigidity portion HR1 and the second high-rigidity portion HR2 may have different moduli.

Referring to FIGS. 8A to 8D, a lattice pattern may be formed by arrangement of the opening portions OP1 to OP5 in the plate layer MP corresponding to the folding region FA. That is, the lattice pattern may be formed in each of the high-rigidity portions HR1, HR2 and HR3 and the low-rigidity portions LR1 and LR2 of the plate layer MP.

Figure 8A:
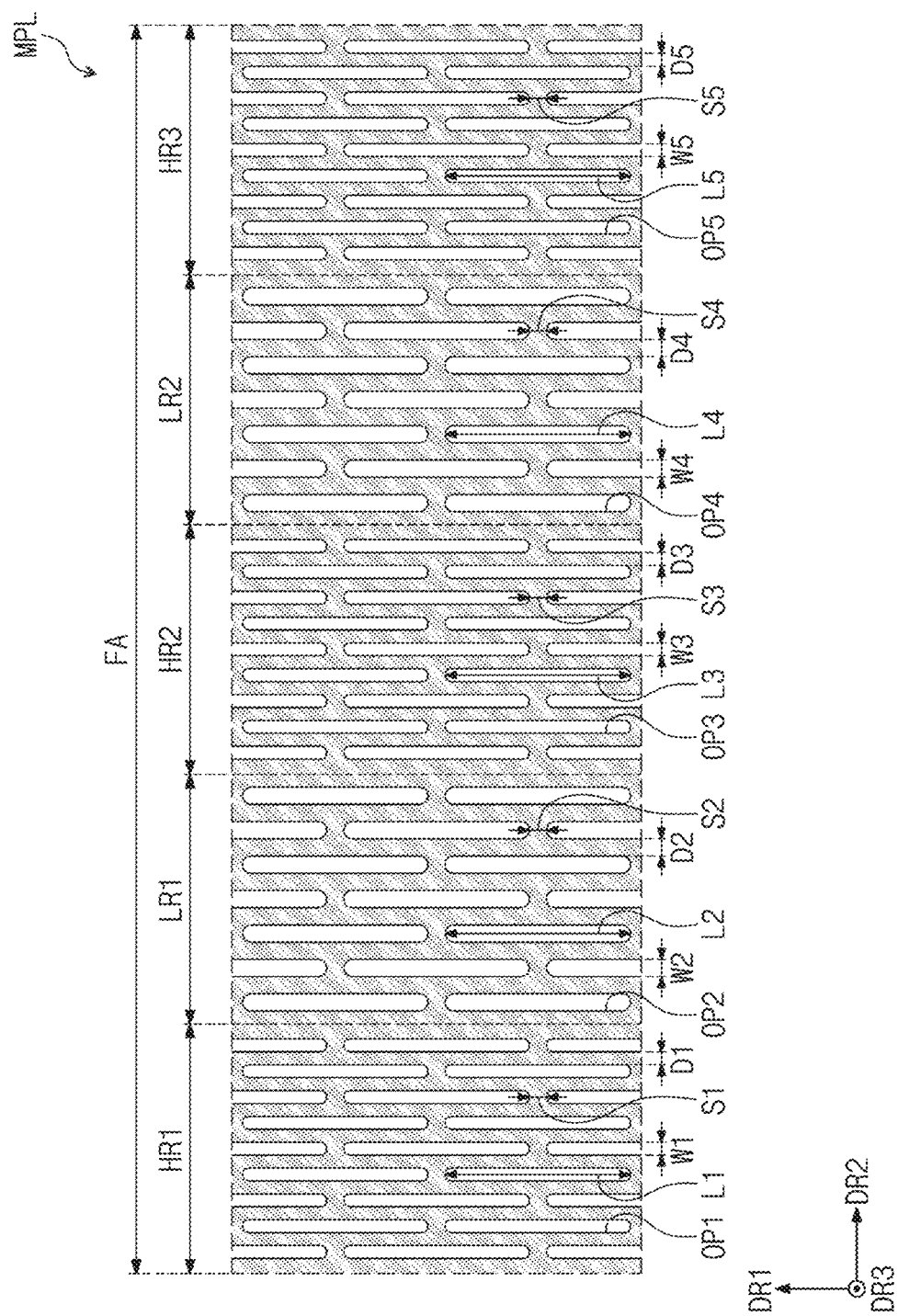
FIGS. 8A to 8D are plan views of a lower member according to an embodiment of the invention.

Referring to FIG. 8A, the first opening portions OP1 of the first high-rigidity portion HR1 may be arranged in the first direction DR1 and the second direction DR2 on a plan view. The first opening portions OP1 may include a plurality of column groups, and each of the column groups may include the first opening portions OP1 arranged in the first direction DR1. Likewise, each of the second to fifth opening portions OP2 to OP5 may include a plurality of column groups. The first opening portions OP1 may be misaligned with each other in the second direction DR2. Likewise, the second to fifth opening portions OP2 to OP5 may be misaligned with each other in the second direction DR2. However, an embodiment of the invention is not limited thereto, and the first to fifth opening portions OP1 to OP5 may be arranged parallel to each of the first direction DR1 and the second direction DR2. The description or features of the arrangement form of the first to fifth opening portions OP1 to OP5 may apply also to embodiments illustrated in FIGS. 8B to 8D.

Referring to FIGS. 8A to 8D, as an aperture or opening ratio is higher, modulus may decrease in one region of the plate layer MPL on a plan view. In an embodiment, for example, as a distance between the opening portions in the first direction DR1 is smaller or less, or as a gap between the opening portions in the second direction DR2 is smaller or less, the modulus of the one region of the plate layer MPL may decrease on a plan view. In addition, as the width of each of the opening portions or the length of each of the opening portions is greater, the modulus of the one region of the plate layer MPL may decrease on a plan view.

The first opening portions OP1 adjacent to each other in the second direction DR2 may be spaced a first gap D1 from each other, and the first opening portions OP1 adjacent to each other in the first direction DR1 may be spaced a first distance S1 from each other. Each of the first opening portions OP1 may have a first length L1 in the first direction DR1 and a first width W1 in the second direction DR2.

The second opening portion OP2 adjacent to each other in the second direction DR2 may be spaced a second gap D2 from each other, and the second opening portion OP2 adjacent to each other in the first direction DR1 may be spaced a second distance S2 from each other. Each of the second opening portions OP2 may have a second length L2 in the first direction DR1 and a second width W2 in the second direction DR2.

The third opening portion OP3 adjacent to each other in the second direction DR2 may be spaced a third gap D3 from each other, and the third opening portion OP3 adjacent to each other in the first direction DR1 may be spaced a third distance S3 from each other. Each of the third opening portions OP3 may have a third length L3 in the first direction DR1 and a third width W3 in the second direction DR2.

The fourth opening portion OP4 adjacent to each other in the second direction DR2 may be spaced a fourth gap D4 from each other, and the fourth opening portion OP4 adjacent to each other in the first direction DR1 may be spaced a fourth distance S4 from each other. Each of the fourth opening portions OP4 may have a fourth length L4 in the first direction DR1 and a fourth width W4 in the second direction DR2.

The fifth opening portion OP5 adjacent to each other in the second direction DR2 may be spaced a fifth gap D5 from each other, and the fifth opening portion OP5 adjacent to each other in the first direction DR1 may be spaced a fifth distance S5 from each other. Each of the fifth opening portions OP5 may have a fifth length L5 in the first direction DR1 and a fifth width W5 in the second direction DR2.

Figure 8B:
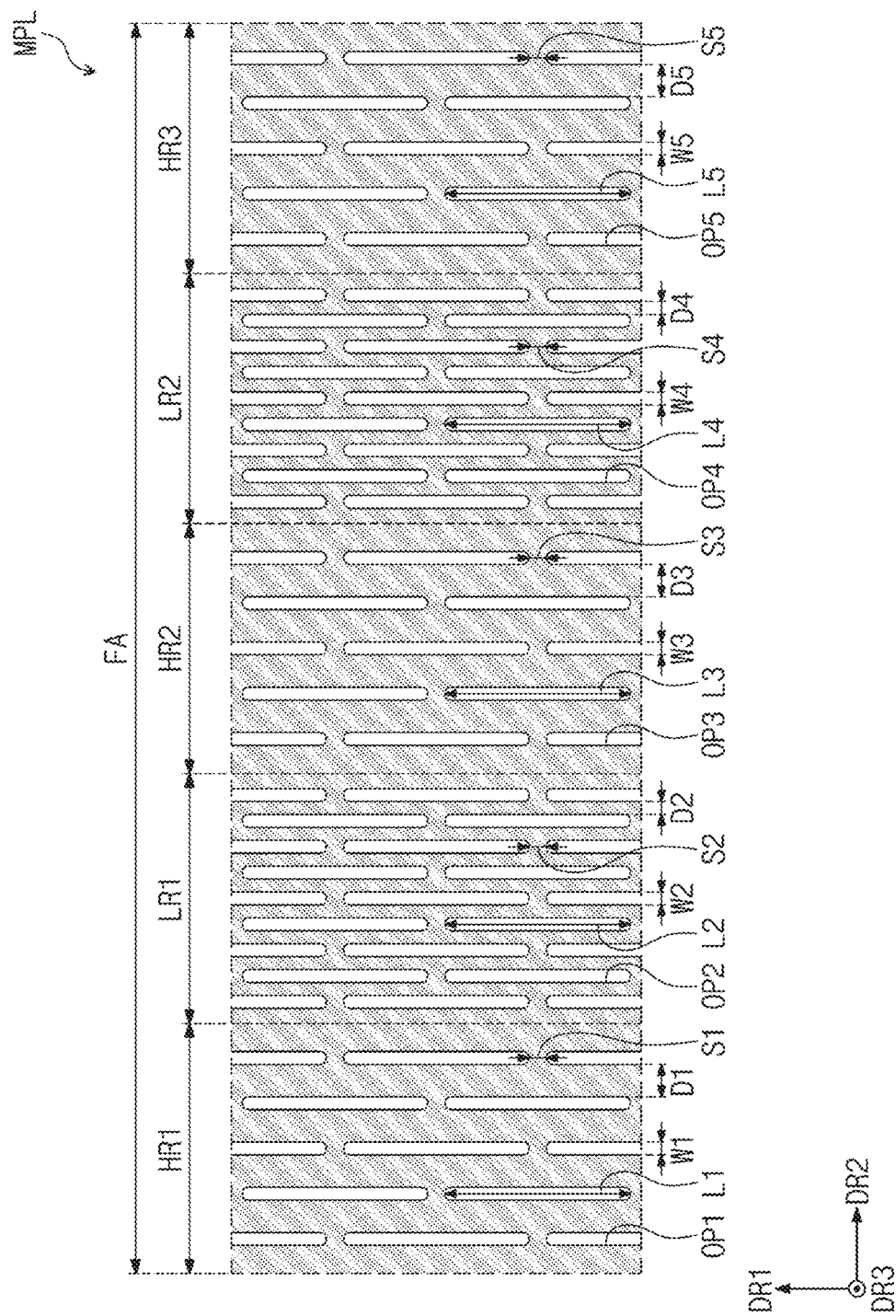
Figure 8C:
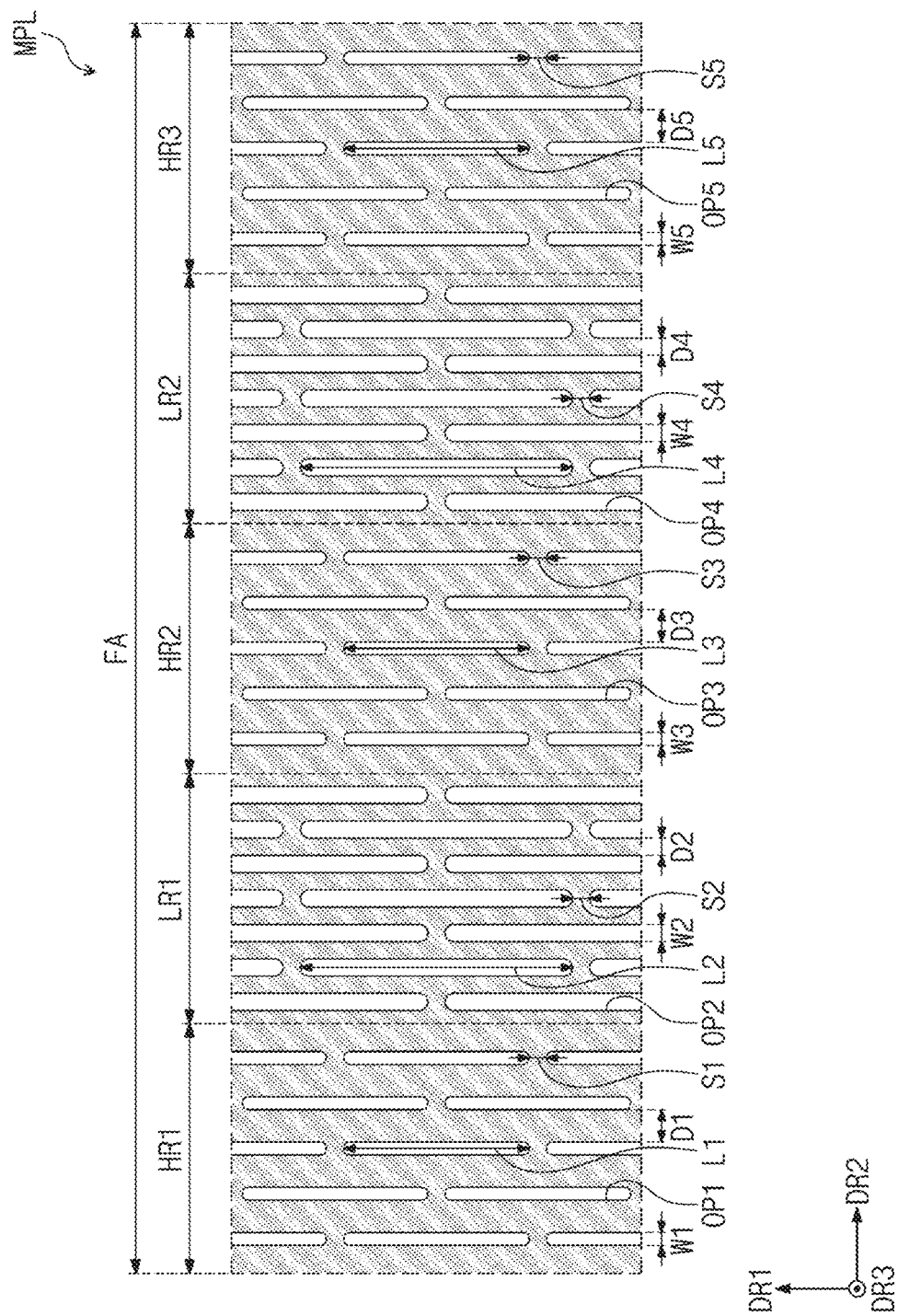
Figure 8D:
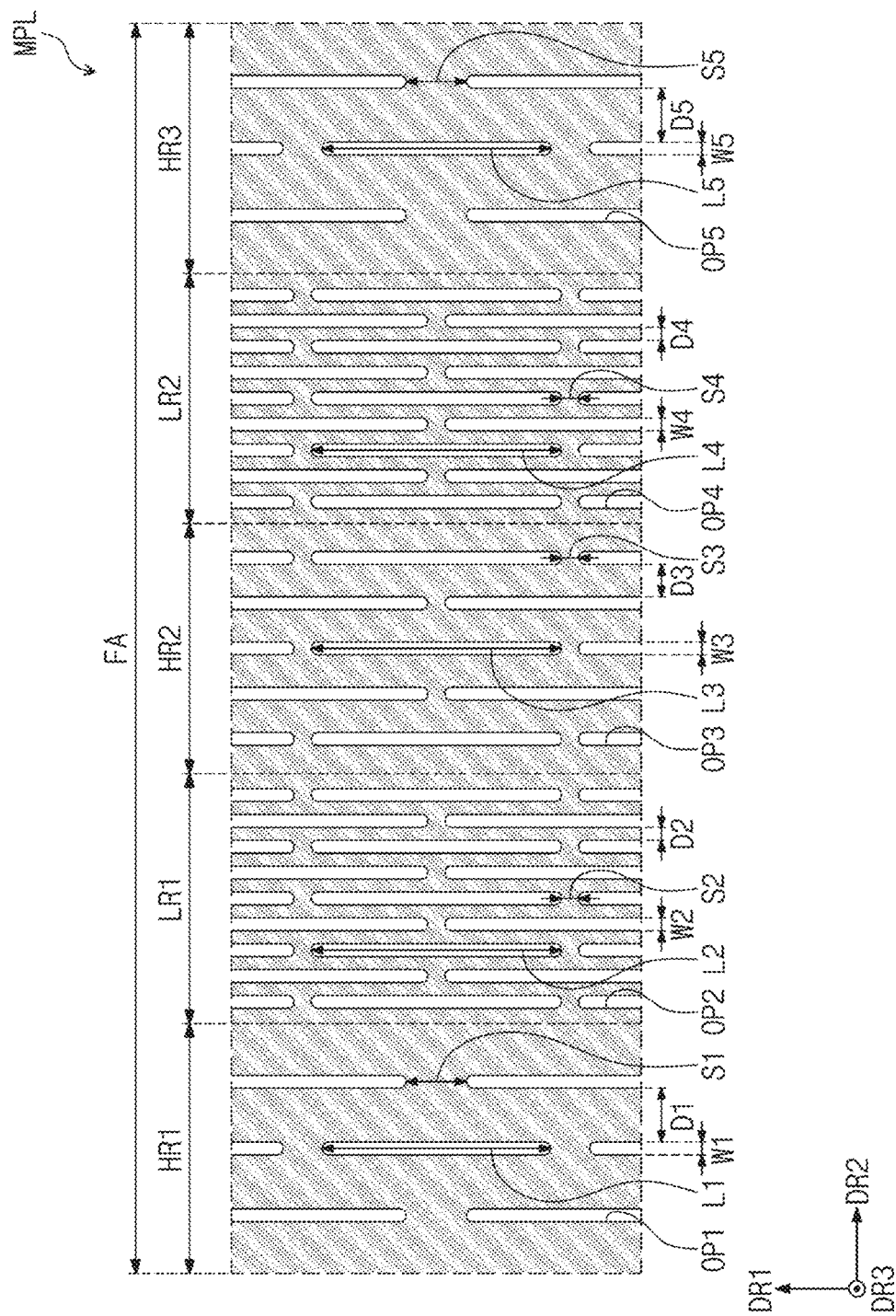

FIGS. 8A to 8C illustrate embodiments in which the first to third high-rigidity portions HR1, HR2 and HR3 have a same modulus as each other and the first and second low-rigidity portions LRT and LR2 have the same modulus as each other. FIG. 8D illustrates an embodiment in which the first and third high-rigidity portions HR1 and HR3 have a same modulus as each other and the first and second low-rigidity portions LRT and LR2 have a same modulus as each other. However, an embodiment of the plate layer MPL is not limited to any one as long as the first low-rigidity part LRT has a less modulus than each of the first and second high-rigidity portions HR1 and HR2 and the second low-rigidity portion LR2 has a less modulus than each of the second and third high-rigidity portions HR2 and HR3.

Referring to FIG. 8A, in an embodiment, a modulus difference between each of the first to third high-rigidity portions HR1, HR2 and HR3 and each of the first and second low-rigidity portions LR1 and LR2 may be achieved by a difference in planar area between the opening portions OP1 to OP5.

In an embodiment, for example, the first to fifth gaps D1 to D5 may be the same as each other, and the first to fifth distances S1 to S5 may be the same as each other. With respect to the first high-rigidity part HR1 and the first low-rigidity part LR1, the first length L1 of the first opening portion OP1 and the second length L2 of the second opening portion OP2 may be the same as each other, and the first width W1 of the first opening portion OP1 may be less than the second width W2 of the second opening portion OP2. However, an embodiment of the invention is not limited thereto. The first width W1 of the first opening portion OP1 and the second width W2 of the second opening portion OP2 may be the same as each other, and the first length L1 of the first opening portion OP1 may be less than the second length L2 of the second opening portion OP2. Alternatively, the first width W1 and the first length L1 of the first opening portion OP1 may be less than the second width W2 and the second length L2 of the second opening portion OP2, respectively. The description above may similarly apply to the second and third high-rigidity portions HR2 and HR3 and the second low-rigidity portion LR2.

Referring to FIG. 8B, in an alternative embodiment, the modulus difference between each of the first to third high-rigidity portions HR1, HR2 and HR3 and each of the first and second low-rigidity portions LR1 and LR2 may be achieved by a gap or distance difference between the opening portions OP1 to OP5. Accordingly, with respect to the same area, the planar area ratios of the first to fifth opening portions OP1 to OP5 may be different from each other.

In an embodiment, for example, the first to fifth widths W1 to W5 may be the same as each other, and the first to fifth lengths L1 to L5 may be the same as each other. With respect to the first high-rigidity part HR1 and the first low-rigidity part LR1, the first distance S1 between the first opening portions OP1 and the second distance S2 between the second opening portions OP2 may be the same as each other, and the first gap D1 between the first opening portions OP1 may be greater than the second gap D2 between the second opening portions OP2. However, an embodiment of the invention is not limited thereto. The first gap D1 and the second gap D2 may be the same as each other, and the first distance S1 may be greater than the second distance S2. Alternatively, the first gap D1 and the first distance S1 between the first opening portions OP1 may be greater than the second gap D2 and the second distance S2 between the second opening portions OP2, respectively. The description above may similarly apply to the second and third high-rigidity portions HR2 and HR3 and the second low-rigidity portion LR2.

Referring to FIG. 8C, in another alternative embodiment, the modulus difference between each of the first to third high-rigidity portions HR1, HR2 and HR3 and each of the first and second low-rigidity portions LR1 and LR2 may be achieved by the difference in planar area between the opening portions OP1 to OP5 and the difference in gap between the opening portions OP1 to OP5. Accordingly, a degree of the modulus difference between each of the first to third high-rigidity portions HR1, HR2 and HR3 and each of the first and second low-rigidity portions LR1 and LR2 may be made great.

In an embodiment, for example, with respect to the first high-rigidity part HR1 and the first low-rigidity part LR1, the first gap D1 between the first opening portions OP1 may be greater than the second gap D2 between the second opening portions OP2. However, an embodiment of the invention is not limited thereto, and the first distance S1 between the first opening portions OP1 may be greater than the second distance S2 between the second opening portions OP2. In addition, the first width W1 of each of the first opening portions OP1 may be less than the second width W2 of each of the second opening portions OP2, and the first length L1 of each of the first opening portions OP1 may be less than the second length L2 of each of the second opening portions OP2. The description above may similarly apply to the second and third high-rigidity portions HR2 and HR3 and the second low-rigidity portion LR2.

Referring to FIG. 8D, in another alternative embodiment, some of the first to third high-rigidity portions HR1, HR2 and HR3 may have different moduli from each other. In an embodiment, for example, the first high-rigidity portion HR1 and the third high-rigidity portion HR3 may have a same modulus as each other, and the first high-rigidity portion HR1 and the second high-rigidity portion HR2 may have different moduli. In an embodiment, the modulus of the first high-rigidity portion HR1 may be greater than the modulus of the second high-rigidity portion HR2. However, an embodiment is not necessarily limited thereto.

A modulus difference between the high-rigidity portions HR1, HR2 and HR3 may be achieved by adjusting the planar area of each of the opening portions OP1, OP3 and OP5 and/or the gap or distance between the opening portions OP1, OP3 and OP5 within the high-rigidity portions HR1, HR2 and HR3.

Referring to FIG. 8D, with respect to the first and second high-rigidity portions HR1 and HR2, the first width W1 and the first length L1 of each of the opening portions OP1 may be the same as the third width W3 and the third length L3 of each of the third opening portions OP3, respectively. The first gap D1 and the first distance S1 between the first opening portions OP1 may be greater than the third gap D3 and the third distance S3 between the third opening portions OP3, respectively. Accordingly, based on the same area, the aperture or opening ratio by the first opening portions OP1 in the first high-rigidity portion HR1 may be lower or less than the aperture or opening ratio by the third opening portions OP3 in the second high-rigidity portion HR2, and the modulus of the first high-rigidity portion HR1 may be higher or greater than the modulus of the second high-rigidity portion HR2.

However, an embodiment of the invention is not limited thereto. The first gap D1 and the first distance S1 may be the same as the third gap D3 and the third distance S3, respectively, and the first width W1 and the first length L1 of each of the opening portions OP1 may be less than the third width W3 and the third length L3 of each of the third opening portions OP3, respectively. Alternatively, the first gap D1 and the first distance S1 may be greater than the third gap D3 and the third distance S3, respectively, and the first width W1 and the first length L1 may be less than the third width W3 and the third length L3, respectively. The description above may similarly apply to the second and third high-rigidity portions HR2 and HR3.

The first low-rigidity part LR1 may have a less modulus than each of the first high-rigidity portion HR1 and the second high-rigidity part HR2. In an embodiment, for example, the planar area of each of the second opening portions OP2 may be the same as the planar area of each of the first opening portions OPT, but the second gap D2 and the second distance S2 may be less than the first gap D1 and the first distance S1, respectively. In addition, the planar area of each of the second opening portions OP2 may be the same as the planar area of each of the third opening portions OP3, but the second gap D2 may be less than the third gap D3. However, an embodiment of the invention is not limited thereto, and the planar area of each of the second opening portions OP2 may be greater than the planar area of each of the first opening portions OPT and the planar area of each of the third opening portions OP3.

A modulus difference between the first low-rigidity portion LR1 and the first high-rigidity portion HR1 may be greater than a modulus difference between the first low-rigidity portion LR1 and the second high-rigidity portion HR2. For example, a difference between the second gap D2 and the first gap D1 may be greater than a difference between the second gap D2 and the third gap D3. However, the arrangement and the planar area of the opening portions OPT to OP5, which achieves the modulus difference between each of the high-rigidity portions HR1, HR2 and HR3 and each of the low-rigidity portions LR1 and LR2, are not limited thereto.

Likewise, the second low-rigidity portion LR2 may have a less modulus than each of the second high-rigidity portion HR2 and the third high-rigidity portion HR3. A modulus difference between the second low-rigidity portion LR2 and the third high-rigidity portion HR3 may be greater than a modulus difference between the second low-rigidity portion LR2 and the second high-rigidity portion HR2.

The plate layer MPL may be disposed not only in the folding region FA but also in the non-folding regions NFA1 and NFA2 (see FIG. 5) described above. In an embodiment, for example, the plate layer MPL may be provided as an integrated plate, and the opening portions OP1 to OP5 may not be defined in a portion corresponding to each of the first and second non-folding regions NFA1 and NFA2 (see FIG. 5) and the opening portions OP1 to OP5 may be defined in a portion corresponding to the folding region FA.

Figure 9A:
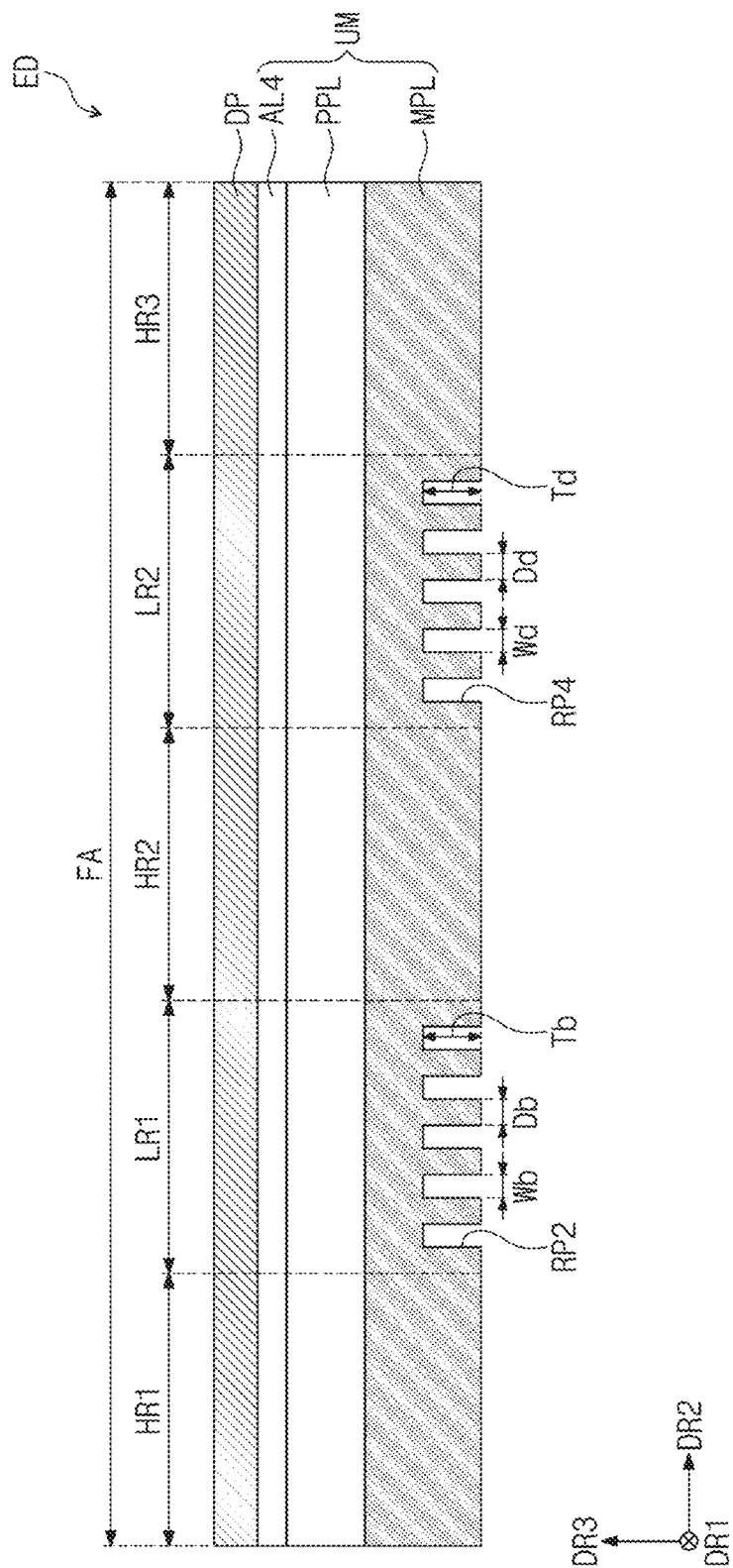
FIGS. 9A to 9C are cross-sectional views of a display device according to an embodiment of the invention.
Figure 9B:
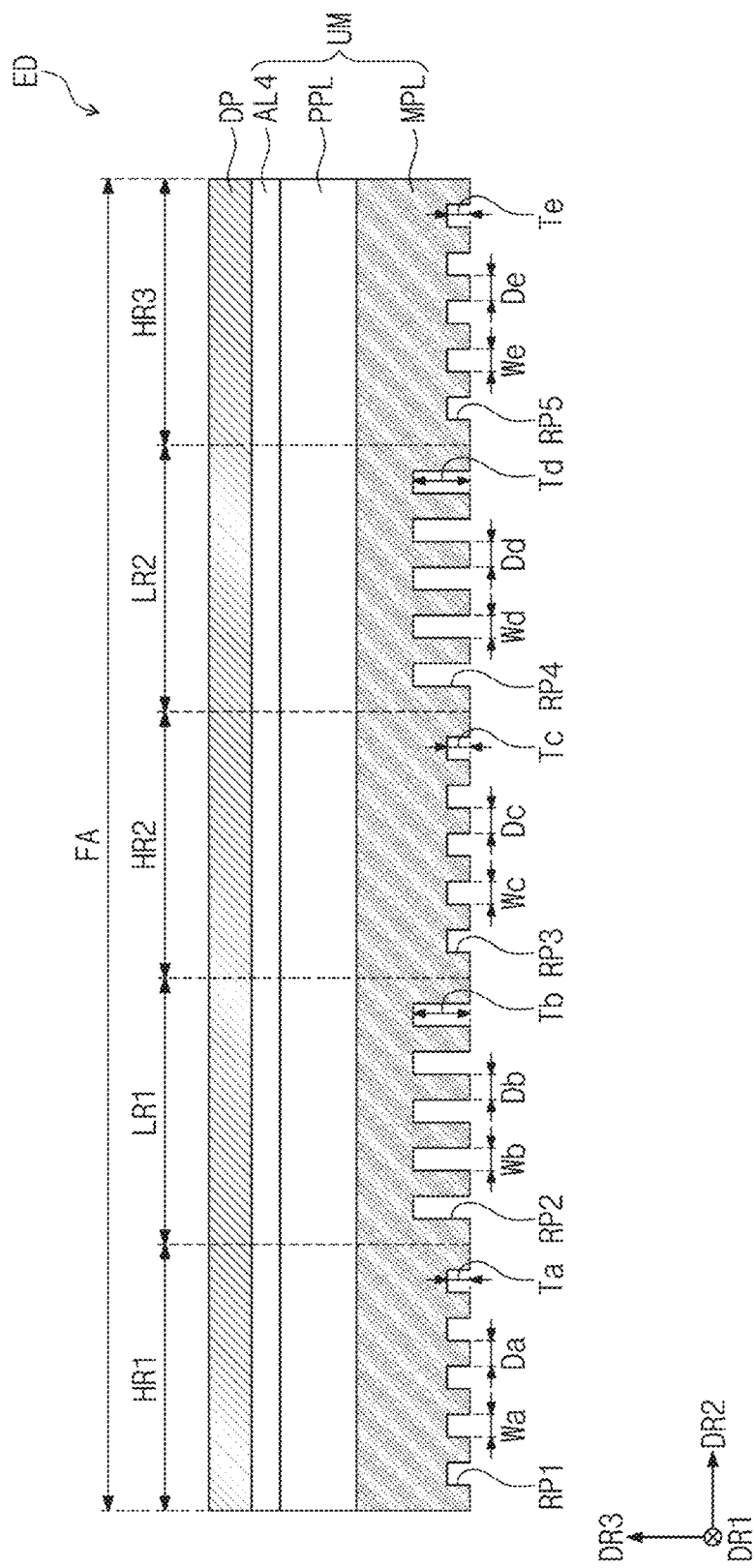
Figure 9C:
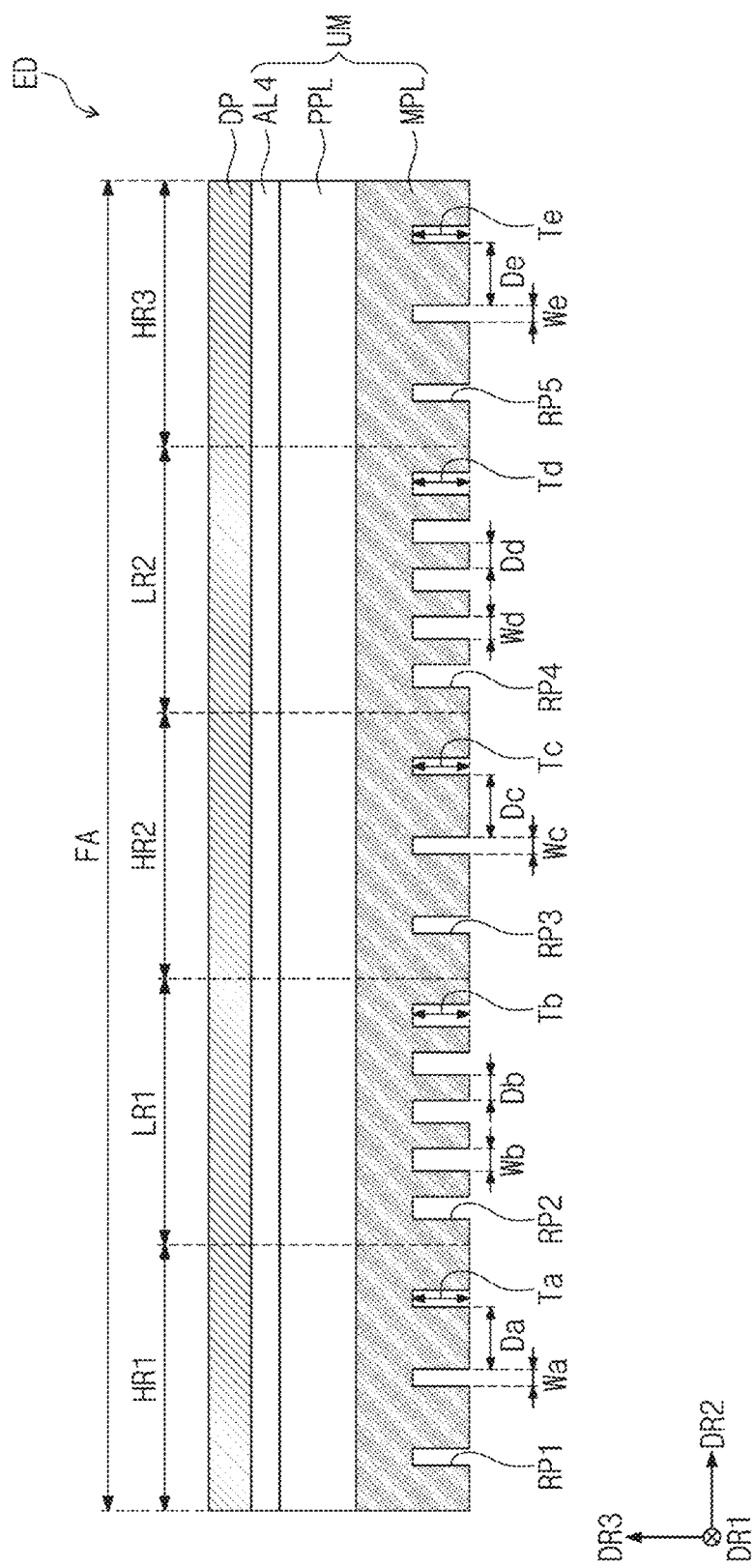

FIGS. 9A to 9C are cross-sectional views of a display device ED according to an embodiment of the invention. FIGS. 9A to 9C illustrate cross sections of the display device ED corresponding to a folding region FA.

Referring to FIGS. 9A to 9C, a plurality of recessed portions RP1 to RP5 corresponding to the folding region FA may be defined in a plate layer MPL. A portion of the plate layer MPL may be recessed in the third direction DR3 to form each of the recessed portions RP1 to RP5. That is, the recessed portions RP1 to RP5 may not pass through the plate layer MPL. The plate layer MPL and a lower member UM including the plate layer MPL may have flexibility improved in the folding region FA by the recessed portions RP1 to RP5.

In the lower member UM, high-rigidity parts HR1, HR2 and HR3 and low-rigidity parts LR1 and LR2 may be embodied according to arrangement of the recessed portions RP1 to RP5 within the plate layer MPL corresponding to the folding region FA. The plate layer MPL may include a first high-rigidity portion, a first low-rigidity portion, a second high-rigidity portion, a second low-rigidity portion, and a third high-rigidity portion, which are arranged in the second direction DR2 and correspond to the first high-rigidity part HR1, the first low-rigidity part LR1, the second high-rigidity part HR2, the second low-rigidity part LR2, and the third high-rigidity part HR3, respectively. Hereinafter, for convenience of description, the high-rigidity portions and the low-rigidity portions of the plate layer MPL will be described using the same reference numbers or symbols for the corresponding high-rigidity parts and low-rigidity parts, respectively.

In one region of the plate layer MPL, as a ratio of an empty space defined by the recessed portions is higher, modulus may decrease. In an embodiment, for example, as a gap between the recessed portions is less, and as a width of each of the recessed portions is greater, the modulus of the one region of the plate layer MPL may decrease in the second direction DR2.

Referring to FIG. 9A, in an embodiment, a modulus difference between each of the first to third high-rigidity portions HR1, HR2 and HR3 and each of the first and second low-rigidity portions LR1 and LR2 may be provided based on whether the recessed portions are formed. In an embodiment, for example, the recessed portions may not be formed in the first to third high-rigidity portions HR1, HR2 and HR3. However, an embodiment of the invention is not limited thereto, and the recessed portions may not be formed only in some of the first to third high-rigidity portions HR1, HR2 and HR3. In an embodiment, for example, the recessed portions may not be formed in the first and third high-rigidity portions HR1 and HR3, and the recessed portions may be formed in the second high-rigidity portion HR2. An embodiment is not limited to any one as long as the first to third high-rigidity portions HR1, HR2 and HR3 each have a greater modulus than each of the first and second low-rigidity portions LRT and LR2.

Second recessed portions RP2 may be formed in the first low-rigidity portions LRT of the plate layer MPL. The second recessed portions RP2 may be spaced apart from each other in the second direction DR2. Each of the second recessed portions RP2 may have a seventh width Wb in the second direction DR2 and a second depth Tb in the third direction DR3. The second recessed portions RP2 may be spaced a seventh gap Db from each other in the second direction DR2.

Fourth recessed portions RP4 may be formed in the second low-rigidity portion LR2 of the plate layer MPL. The fourth recessed portions RP4 may be spaced apart from each other in the second direction DR2. Each of the fourth recessed portions RP4 may have a ninth width Wd in the second direction DR2 and a fourth depth Td in the third direction DR3. The fourth recessed portions RP4 may be spaced a ninth gap Dd from each other in the second direction DR2.

In one region of the plate layer MPL, as a length of each of the recessed portions in the first direction DR1 and a width thereof in the second direction DR2 are greater, the modulus of the one region may decrease. In addition, a gap between the recessed portions is less, the modulus of the one region may decrease.

The modulus of the first low-rigidity portion LRT in which the second recessed portions RP2 are formed may be less than the modulus of each of the first and second high-rigidity portions HR1 and HR3 in which the recessed portions are not formed. Likewise, the modulus of the second low-rigidity portion LR2 in which the fourth recessed portions RP4 are formed may be less than the modulus of each of the second and third high-rigidity portions HR2 and HR3 in which the recessed portions are not formed.

The modulus of the first low-rigidity portion LRT may be substantially the same as the modulus of the second low-rigidity portion LR2. In an embodiment, for example, the first low-rigidity portion LRT and the second low-rigidity portion LR2 may be symmetrical with respect to the second high-rigidity portion HR2. In an embodiment, for example, the seventh width Wb of each of the second recessed portions RP2 may be the same as the ninth width Wd of each of the fourth recessed portions RP4, and the seventh gap Db between the second recessed portions RP2 may be the same as the ninth gap Dd between the fourth recessed portions RP4. The second depth Tb of each of the second recessed portions RP2 may be the same as the fourth depth Td of each of the fourth recessed portions RP4.

However, an embodiment is not limited thereto. The modulus of the first low-rigidity portion LRT and the modulus of the second low-rigidity portion LR2 may be the same as each other, but arrangement of the second recessed portions RP2 and arrangement of the fourth recessed portions RP4 may be different from each other. Alternatively, the modulus of the first low-rigidity portion LR1 and the modulus of the second low-rigidity portion LR2 may be different from each other. An embodiment is not limited to any one as long as each of the first low-rigidity portion LRT and the second low-rigidity portion LR2 may have a less modulus than adjacent high-rigidity portions among the high-rigidity portions HR1, HR2 and HR3.

Referring to FIGS. 9B and 9C, in an alternative embodiment, recessed portions RP1, RP3 and RP5 may be defined in the high-rigidity portions HR1, HR2 and HR3, respectively. FIGS. 9B and 9C exemplarily illustrate embodiments in which the first to third high-rigidity portions HR1, HR2 and HR3 have a same modulus as each other. However, an embodiment is not limited thereto, and at least two high-rigidity portions of the first to third high-rigidity portions HR1, HR2 and HR3 have different moduli. In an embodiment, for example, each of the first and third high-rigidity portions HR1 and HR3 may have a greater modulus than the second high-rigidity portion HR2.

First recessed portions RP1 may be formed in the first high-rigidity portion HR1 of the plate layer MPL. The first recessed portions RP1 may be spaced a sixth gap Da from each other in the second direction DR2. Each of the first recessed portions RP1 may have a sixth width Wa in the second direction DR2 and a first depth Ta in the third direction DR3.

Third recessed portions RP3 may be formed in the second high-rigidity portion HR2 of the plate layer MPL. The third recessed portions RP3 may be spaced an eighth gap Dc from each other in the second direction DR2. Each of the third recessed portions RP3 may have an eighth width We in the second direction DR2 and a third depth Tc in the third direction DR3.

Fifth recessed portions RP5 may be formed in the third high-rigidity portion HR3 of the plate layer MPL. The fifth recessed portions RP5 may be spaced a tenth gap De from each other in the second direction DR2. Each of the fifth recessed portions RP5 may have a tenth width We in the second direction DR2 and a fifth depth Te in the third direction DR3.

Referring to FIG. 9B, in an embodiment, the sixth to tenth gaps Da to De may be the same as each other, and the sixth to tenth widths Wa to We may be the same as each other. Each of the first depth Ta and the third depth Tc may be less than the second depth Tb, and each of the third depth Tc and the fifth depth Te may be less than the fourth depth Td. That is, as each of the second recessed portions RP2 has a greater depth (second depth Tb) than each of the first and third recessed portions RP1 and RP3, the first low-rigidity portion LRT may have a modulus less than the modulus of each of the first and second high-rigidity portions HR1 and HR2. In addition, as each of the fourth recessed portions RP4 has a greater depth (fourth depth Td) than each of the third and fifth recessed portions RP3 and RP5, the second low-rigidity portion LR2 have a modulus less than the modulus of each of the second and third high-rigidity portions HR2 and HR3.

However, an embodiment is not limited thereto. The second depth Tb may be greater than each of the first depth Ta and the third depth Tc, and the seventh width Wb ay be greater than each of the sixth width Wa and the eighth width We. That is, as the size of an empty space defined by the second recessed portions RP2 is greater than each of the size of an empty space defined by the first recessed portions RP1 and the size of an empty space defined by the third recessed portions RP3, the modulus of the first low-rigidity portion LR1 may be less than the modulus of each of the first high-rigidity portion HR1 and the second high-rigidity portion HR2. The description above may similarly apply to the second high-rigidity portion HR2, the second low-rigidity portion LR2, and the third high-rigidity portion HR3.

Referring to FIG. 9C, in an alternative embodiment, the first to fifth depths Ta to Te may be the same as each other. The seventh width Wb may be greater than each of the sixth width Wa and the eighth width Wc, and the ninth width Wd may be greater than each of the eighth width We and the tenth width We. That is, as each of the second recessed portions RP2 has a greater width (seventh width Wb) than each of the first and third recessed portions RP1 and RP3, the first low-rigidity portion LR1 may have a modulus less than the modulus of each of the first and second high-rigidity portions HR1 and HR2. In addition, as each of the fourth recessed portions RP4 has a greater width (ninth width Wd) than each of the third and fifth recessed portions RP3 and RP5, the second low-rigidity portion LR2 may have a modulus less than the modulus of each of the second and third high-rigidity portions HR2 and HR3.

Referring to FIG. 9C, the seventh gap Db may be less than each of the sixth gap Da and the eighth gap Dc, and the ninth gap Dd may be less than each of the eighth gap Dc and the tenth gap De.

Based on the same volume, a ratio of the second recessed portions RP2 formed in the first low-rigidity portion LRT may be higher than each of a ratio of the first recessed portions RP1 formed in the first high-rigidity portion HR1 and a ratio of the third recessed portions RP3 formed in the second high-rigidity portion HR2. Accordingly, the modulus of the first low-rigidity portion LRT may be less than the modulus of each of the first and second high-rigidity portions HR1 and HR2. Likewise, a ratio of the fourth recessed portions RP4 formed in the second low-rigidity portion LR2 may be higher than each of a ratio of the third recessed portions RP3 formed in the second high-rigidity portion HR2 and a ratio of the fifth recessed portions RP5 formed in the third high-rigidity portion HR3.

The embodiments illustrated in FIGS. 9A to 9C are examples, and the arrangement and the size of the recessed portions RP1 to RP5 are not limited to the illustrated embodiments as long as each of the low-rigidity portions LRT and LR2 may have a less modulus than adjacent high-rigidity portions among the high-rigidity portions HR1, HR2 and HR3.

The plate layer MPL may be disposed not only in the folding region FA but also in the non-folding regions NFA1 and NFA2 (see FIG. 5) described above. For example, the plate layer MPL may be provided as an integrated plate, and the recessed portions RP1 to RP5 may not be defined in a portion corresponding to each of the first and second non-folding regions NFA1 and NFA2 (see FIG. 5) and the recessed portions RP1 to RP5 may be defined in a portion corresponding to the folding region FA.

Figure 10A:
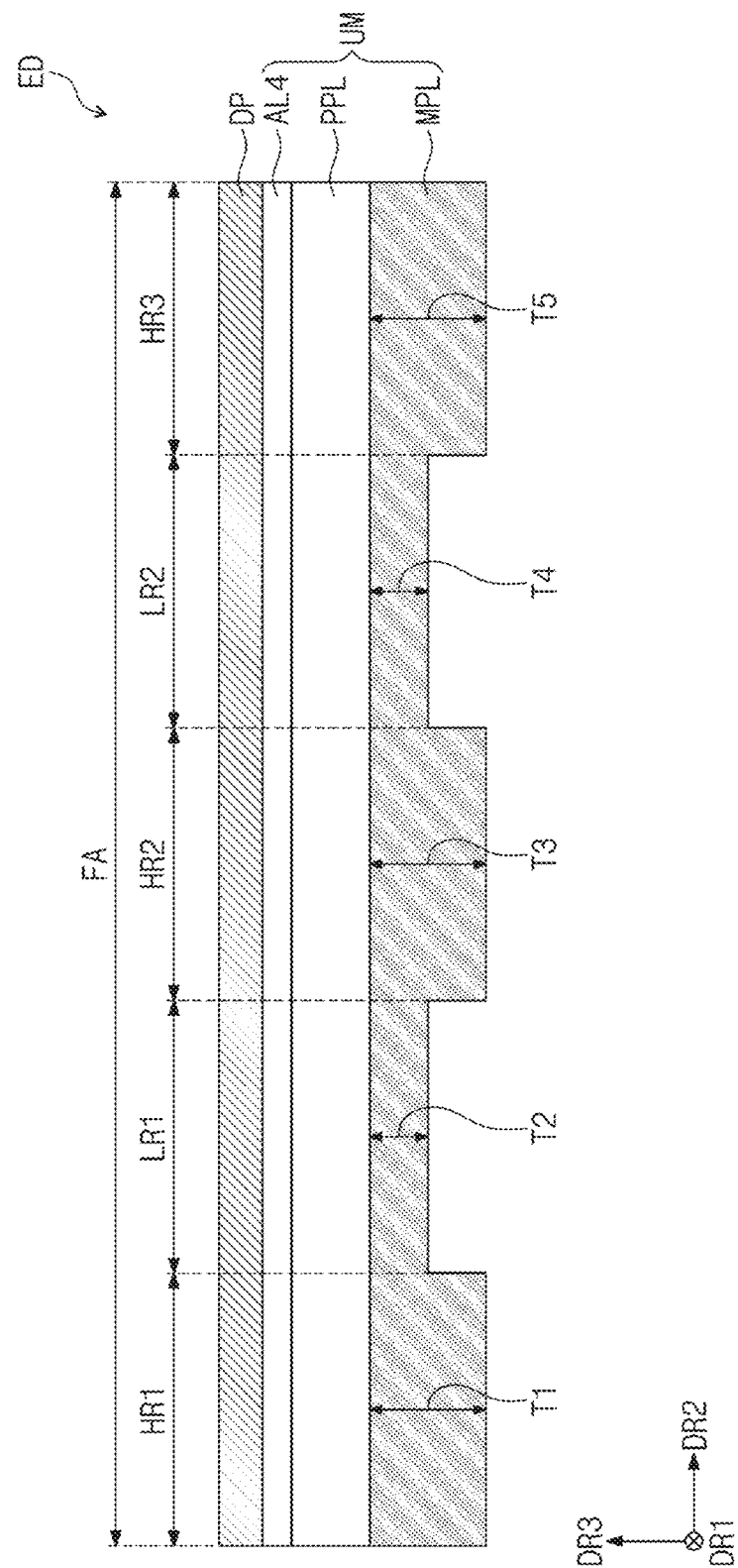
FIGS. 10A and 10B are cross-sectional views of a display device according to an embodiment of the invention.
Figure 10B:
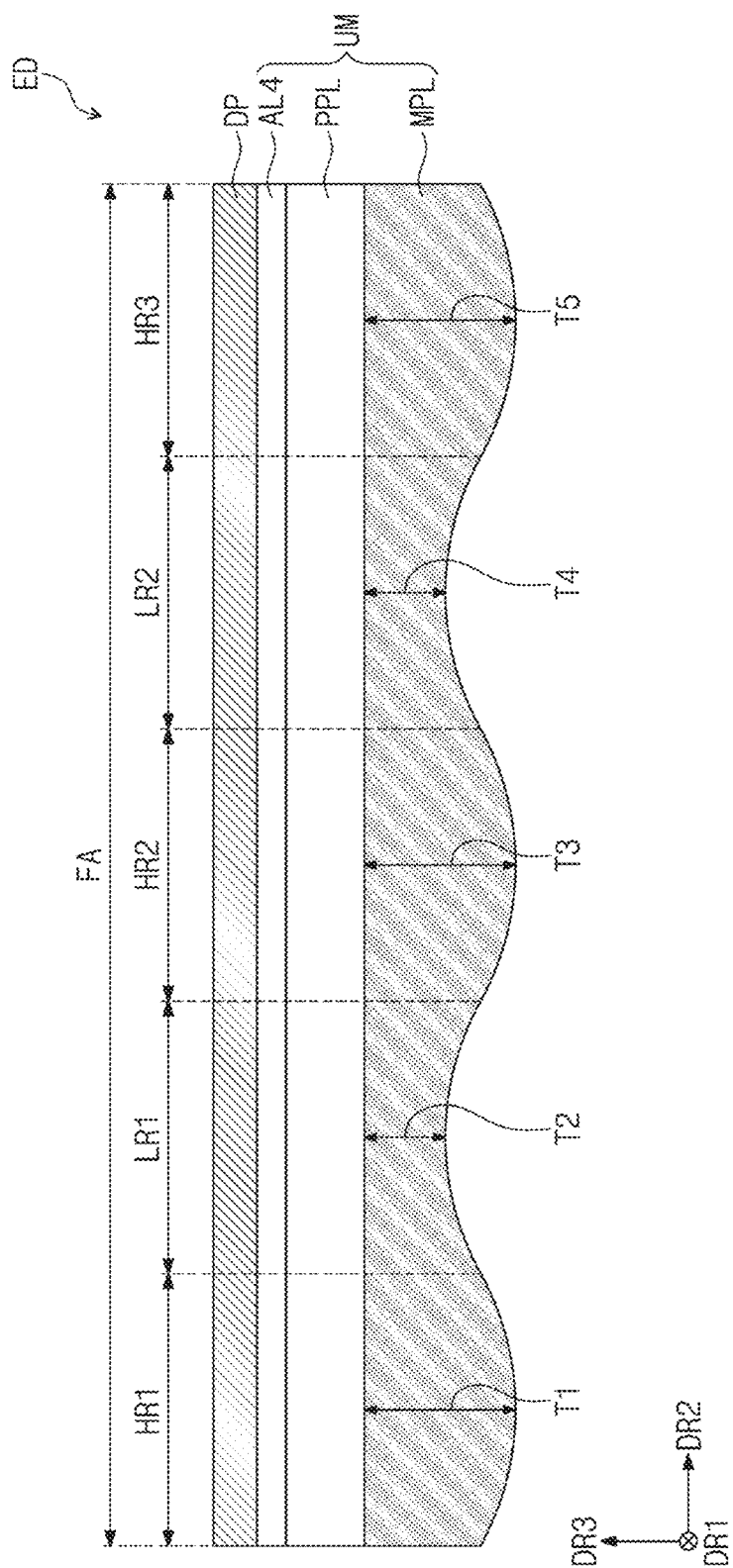

FIGS. 10A and 10B are cross-sectional views of a display device ED according to an embodiment of the invention. FIGS. 10A and 10B illustrate cross sections of the display device ED corresponding to a folding region FA.

Referring to FIGS. 10A and 10B, an embodiment of a plate layer MPL may have a thickness that is variable within the folding region FA. The plate layer MPL may include a portion having a small thickness within the folding region FA to improve the flexibility in the folding region FA.

In a lower member UM, the thickness of the plate layer MPL corresponding to the folding region FA may be adjusted to embody high-rigidity portions HR1, HR2 and HR3 and low-rigidity portions LR1 and LR2. The plate layer MPL may include a first high-rigidity portion, a first low-rigidity portion, a second high-rigidity portion, a second low-rigidity portion, and a third high-rigidity portion, which are arranged in the second direction DR2 and correspond to the first high-rigidity part HR1, the first low-rigidity part LR1, the second high-rigidity part HR2, the second low-rigidity part LR2, and the third high-rigidity part HR3, respectively. Hereinafter, for convenience of description, the high-rigidity portions and the low-rigidity portions of the plate layer MPL will be described using the same reference numbers or symbols for the corresponding high-rigidity parts and low-rigidity parts, respectively.

Referring to FIGS. 10A and 10B, in an embodiment, the first to third high-rigidity portions HR1, HR2 and HR3 may have a first thickness T1, a third thickness T3, and a fifth thickness T5, respectively, and the first and second low-rigidity portions LR1 and LR2 may have a second thickness T2 and a fourth thickness T4, respectively. In such an embodiment, a thickness of a specific portion may correspond to a medial thickness of the specific portion.

As the thickness of one region of the plate layer MPL is less, the modulus may decrease. In an embodiment, for example, the second thickness T2 of the first low-rigidity portion LR1 may be less than each of the first thickness T1 of the adjacent first high-rigidity portion HR1 and the third thickness T3 of the adjacent second high-rigidity portion HR2. In addition, the fourth thickness T4 of the second low-rigidity portion LR2 may be less than each of the third thickness T3 of the adjacent second high-rigidity portion HR2 and the fifth thickness T5 of the adjacent third high-rigidity portion HR3.

FIGS. 10A and 10B illustrate embodiments in which the first to third high-rigidity portions HR1, HR2 and HR3 have the same modulus as each other and the first and second low-rigidity portions LRT and LR2 have the same modulus as each other. However, an embodiment of the plate layer MPL is not limited to any one as long as each of the low-rigidity portions LRT and LR2 has a less modulus than adjacent high-rigidity portions among the high-rigidity portions HR1, HR2 and HR3.

The plate layer MPL may have a symmetrical structure with respect to the second high-rigidity portion HR2 in the folding region FA. In an embodiment, for example, the second thickness T2 of the first low-rigidity portion LRT may be the same as the fourth thickness T4 of the second low-rigidity portion LR2, and the first thickness T1 of the first high-rigidity portion HR1 may be the same as the fifth thickness T5 of the third high-rigidity portion HR3. However, an embodiment of the plate layer MPL is not limited thereto.

Referring to FIG. 10A, in an embodiment, the plate layer MPL may have a thickness that is uniform in the high-rigidity portions HR1, HR2 and HR3. In an embodiment, for example, the high-rigidity portions HR1, HR2 and HR3 may have a thickness maintained uniformly in the second direction DR2, and a rear surface of the plate layer MPL corresponding to the high-rigidity portions HR1, HR2 and HR3 may be flat. The low-rigidity portions LRT and LR2 of the plate layer MPL may have a thickness maintained uniformly in the second direction DR2, and a rear surface of the plate layer MPL corresponding to the low-rigidity portions LRT and LR2 may be flat.

In the rear surface of the plate layer MPL corresponding to the folding region FA, a thickness difference between each of the high-rigidity portions HR1, HR2 and HR3 and each of the low-rigidity portions LRT and LR2 may cause a stepped portion at a boundary between each of the high-rigidity portions HR1, HR2 and HR3 and each of the low-rigidity portions LRT and LR2. That is, the rear surface of the plate layer MPL corresponding to the low-rigidity portions LRT and LR2 may be recessed in the third direction DR3 with respect to the rear surface of the plate layer MPL corresponding to the high-rigidity portions HR1, HR2 and HR3.

Referring to FIG. 10B, in an alternative embodiment, the plate layer MPL may have a thickness that is variable in the second direction DR2. In an embodiment, for example, the thickness may be variable also within the high-rigidity portions HR1, HR2 and HR3 and the low-rigidity portions LRT and LR2 in the second direction DR2.

With respect to the second high-rigidity portion HR2, the second high-rigidity portion HR2 may have the maximum thickness (third thickness T3) in the middle thereof, and the second high-rigidity portion HR2 may have a rear surface including a curved surface that is convex. Each of the first and third high-rigidity portions HR1 and HR3 may also have the maximum thickness (first thickness T1 or fifth thickness T5) in a middle portion thereof. Each of the high-rigidity portions HR1, HR2 and HR3 may have a relatively large thickness within the plate layer MPL and thus, have a great modulus within the folding region FA.

The first low-rigidity part LRT may have the smallest or least thickness (second thickness T2) in the middle thereof, and the first low-rigidity part LRT may have a rear surface including a curved surface that is concave. The second low-rigidity part LR2 may also have the least thickness (fourth thickness T4) in a middle portion thereof. Each of the low-rigidity portions LRT and LR2 may have a relatively thin thickness within the plate layer MPL and thus, have a low modulus within the folding region FA.

The middle portion of each of the high-rigidity portions HR1, HR2 and HR3 and the middle portion of each of the adjacent low-rigidity portions LRT and LR2 may be connected to each other by a curved surface. However, an embodiment of the invention is not limited thereto, and the middle portion of each of the high-rigidity portions HR1, HR2 and HR3 and the middle portion of each of the adjacent low-rigidity portions LR1 and LR2 may be connected by a flat surface such as an inclined surface.

The shapes of the plate layer MPL illustrated in FIGS. 10A and 10B are examples, and the shape of the plate layer MPL on a cross-sectional view is not limited to the illustrated embodiments as long as each of the low-rigidity portions LR1 and LR2 may have a less modulus than adjacent high-rigidity portions among the high-rigidity portions HR1, HR2 and HR3.

The plate layer MPL may be disposed not only in the folding region FA but also in the non-folding regions NFA1 and NFA2 (see FIG. 5) described above. In an embodiment, for example, the plate layer MPL may be provided as an integrated plate, and a portion of the plate layer MPL, which corresponds to each of the first and second non-folding regions NFA1 and NFA2 (see FIG. 5), may have a greater thickness than the low-rigidity portions LR1 and LR2.

Figure 11B:
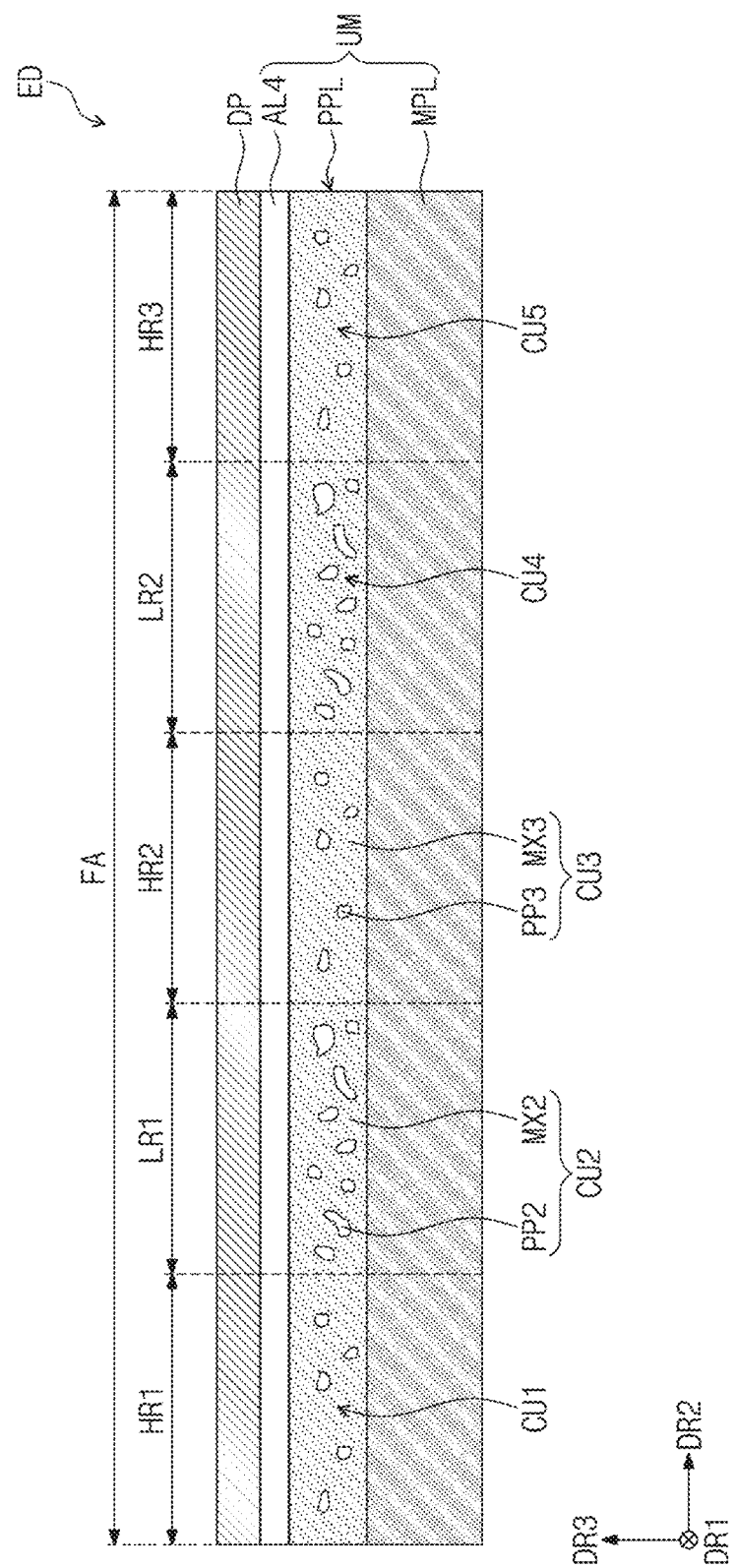

FIGS. 11A and 11B are cross-sectional views of a display device ED according to an embodiment of the invention. FIGS. 11A and 11B illustrate cross sections of the display device ED corresponding to a folding region FA.

Referring to FIG. 11A, in an embodiment, a protective layer PPL may include a plurality of film parts FL1 to FL5 disposed to correspond to the folding region FA. In a lower member UM, high-rigidity parts HR1, HR2 and HR3 and low-rigidity pars LR1 and LR2 may be embodied according to arrangement of the film parts FL1 to FL5.

The film parts FL1 to FL5 may include first to fifth film parts FL1 to FL5. The first to fifth film parts FL1 to FL5 may be disposed to correspond to the first high-rigidity part HR1, the first low-rigidity part LRT, the second high-rigidity part HR2, the second low-rigidity part LR2, and the third high-rigidity part HR, respectively.

Each of the first to fifth film parts FL1 to FL5 may include a flexible material. In an embodiment, for example, each of the first to fifth film parts FL1 to FL5 may include a polymer resin. Accordingly, the protective layer PPL and the lower member UM including the protective layer PPL may have flexibility improved in the folding region FA. However, the material of the first to fifth film parts FL1 to FL5 is not limited thereto.

The first to fifth film parts FL1 to FL5 may be arranged in the second direction DR2 and in contact with adjacent film parts in the second direction DR2. The first, third and fifth film parts FL1, FL3 and FL5, which correspond to the first to third high-rigidity parts HR1, HR2 and HR3, respectively, may each have a relatively high modulus among the first to fifth film parts FL1 to FL5. The second and fourth film parts FL2 and FL4, which correspond to the first and second low-rigidity parts LRT and LR2, respectively, may each have a relatively low modulus among the first to fifth film parts FL1 to FL5.

In an embodiment, the first, third and fifth film parts FL1, FL3 and FL5 may have the same modulus as each other, and the second and fourth film parts FL2 and FL4 may have the same modulus as each other. However, an embodiment is not limited to any one as long as each of the second and fourth film parts FL2 and FL4 has a less modulus than adjacent film parts among the first, third and fifth film parts FL1, FL3 and FL5.

The first, third and fifth film parts FL1, FL3 and FL5, each of which has a high modulus, and the second and fourth film parts FL2 and FL4, each of which has a low modulus, may include different materials from each other. However, an embodiment of the invention is not limited thereto. The film parts FL1 to FL5 may include a same material as each other, but be formed to have different moduli by making a difference in degree of stretch in a stretching process or by further adding an additional material thereinto.

The protective layer PPL may be disposed not only in the folding region FA but also in the non-folding regions NFA1 and NFA2 (see FIG. 5) described above. In an embodiment, for example, the protective layer PPL may further include first and second additional film parts that are disposed in the first and second non-folding regions NFA1 and NFA2, respectively. The first additional film part may be distinguished from the first film part FL1 and arranged on the same layer as the first film part FL1 in the second direction DR2, and the second additional film part may be distinguished from the fifth film part FL5 and disposed on the same layer as the fifth film part FL5 in the second direction DR2. In such an embodiment, each of the first and second additional film parts may have a higher modulus than the film parts FL1 to FL5 disposed in the folding region FA. However, an embodiment of the invention is not limited thereto, and each of the first and second additional film parts may have substantially the same modulus as an adjacent film part.

An embodiment of the protective layer PPL is not limited thereto, and the first film part FL1 may extend from the folding region FA to the first non-folding region NFA1 (see FIG. 5). The fifth film part FL5 may extend from the folding region FA to the second non-folding region NFA2 (see FIG. 5). That is, a boundary between the first non-folding region NFA1 (see FIG. 5) and the folding region FA may overlap the first film part FL1, and a boundary between the second non-folding region NFA2 (see FIG. 5) and the folding region FA may overlap the fifth film part FL5.

Referring to FIG. 11B, in an alternative embodiment, the protective layer PPL may include a cushion layer, and may include a plurality of cushion parts CU1 to CU5 that are disposed to correspond to the folding region FA. In a lower member UM, high-rigidity parts HR1, HR2 and HR3 and low-rigidity parts LR1 and LR2 may be embodied according to a ratio of pores formed inside the cushion parts CU1 to CU5.

The cushion parts CU1 to CU5 may include first to fifth cushion parts CU1 to CU5. The first to fifth cushion parts CU1 to CU5 may correspond to the first high-rigidity part HR1, the first low-rigidity part LR1, the second high-rigidity part HR2, the second low-rigidity part LR2, and the third high-rigidity part HR3, respectively.

The cushion parts CU1 to CU5 may each include a matrix part with pores defined therein. That is, the cushion parts CU1 to CU5 may each have a porous structure. In FIG. 11B, matrix parts MX2 and MX3 and pores PP2 and PP3 of the second and third cushion parts CU2 and CU3 among the cushion parts CU1 to CU5 are designated by reference numbers or symbols, respectively. Hereinafter, the description is based on the second and third cushion parts CU2 and CU3, but may apply to the other cushion parts.

The second cushion part CU2 may include the second matrix part MX2 and the second pores PP2 dispersed in the second matrix part MX2. The third cushion part CU3 may include the third matrix part MX3 and the third pores PP3 dispersed in the third matrix part MX3. Due to the pores PP2 and PP3 dispersed inside the matrix parts MX2 and MX3, the protective layer PPL may improve in elasticity and may absorb an impact applied to the lower member UM. As the protective layer PPL includes the cushion parts CU1 to CU5, each of which has a porous structure, the impact resistance of the lower member UM may be improved.

The second matrix part MX2 and the third matrix part MX3 may be provided as one body or integrally formed as a single unitary and indivisible part. The second matrix part MX2 and the third matrix part MX3 may include a same material as each other. The second matrix part MX2 and the third matrix part MX3 may have a single configuration and be distinguished from each other according to arrangement regions. Likewise, the respective matrix parts of the first to fifth cushion parts CU1 to CU5 may be in the form of substantially one body, and the first to fifth cushion parts CU1 to CU5 may have a single interconnected configuration.

The matrix parts MX2 and MX3 may each include a flexible material. Accordingly, the protective layer PPL and the lower member UM including the same may have flexibility improved in the folding region FA. In an embodiment, for example, the matrix parts MX2 and MX3 may each include acrylonitrile butadiene styrene copolymer (ABS), polyurethane (PU), polyethylene (PE), ethylene vinyl acetate (EVA), polyvinyl chloride (PVC) or the like. However, the material of the matrix parts MX2 and MX3 is not limited to the examples above.

The pores PP2 and PP3 may be surrounded by the matrix parts MX2 and MX3 and formed inside the matrix parts MX2 and MX3, respectively. However, an embodiment of the invention is not limited thereto, and some of the pores PP2 and PP3 may pass through the matrix parts MX2 and MX3 or be partially recessed from outer surfaces of the matrix parts MX2 and MX3, respectively. That is, the pores PP2 and PP3 may be provided in various shapes according to gas formation conditions or distribution environments during a foaming process. The pores PP2 and PP3 may be formed to have various shapes, and may not be limited to any one shape or uniformized.

The first, third and fifth cushion parts CUT, CU3 and CU5, which correspond to the first to third high-rigidity parts HR1, HR2 and HR3, respectively, may each have a relatively high modulus within the cushion parts CU1 to CU5. The second and fourth cushion parts CU2 and CU4, which correspond to the first and second low-rigidity parts LR1 and LR2, respectively, may each have a relatively low modulus within the cushion parts CU1 to CU5. The modulus of each of the cushion parts CU1 to CU5 may vary depending on a ratio of the pores dispersed in the matrix part.

In an embodiment, for example, based on the same volume, a ratio of the second pores PP2 dispersed in the second matrix part MX2 may be higher than a ratio of the third pores PP3 dispersed in the third matrix part MX3. Accordingly, the second cushion part CU2 corresponding to the first low-rigidity part LR1 may have a low modulus than the third cushion part CU3 corresponding to the second high-rigidity part HR2.

The ratio of the pores PP2 in the second cushion part CU2 may be higher than a ratio of the pores in the first cushion part CU1. In addition, a ratio of the pores in the fourth cushion part CU4 may be higher than each of the ratio of the pores PP3 in the third cushion part CU3 and a ratio of the pores in the fifth cushion part CU5.

The protective layer PPL may be disposed not only in the folding region FA but also in the non-folding regions NFA1 and NFA2 (see FIG. 5) described above. In an embodiment, for example, the protective layer PPL may include additional cushion parts that are disposed in the first and second non-folding regions NFA1 and NFA2, respectively, and the additional cushion parts may be in the form of substantially one body on the same layer, that is, a single unitary and indivisible body in a same layer, as the first to fifth cushion parts CU1 to CU5. That is, the additional cushion parts and the cushion parts CU1 to CU5 may be distinguished from each other according to arrangement regions within the single cushion layer. A ratio of pores in each of the additional cushion parts may be lower than the ratio of the pores in each of the cushion parts CU1 to CU5, based on a same volume. However, an embodiment is not limited thereto.

Figure 12:
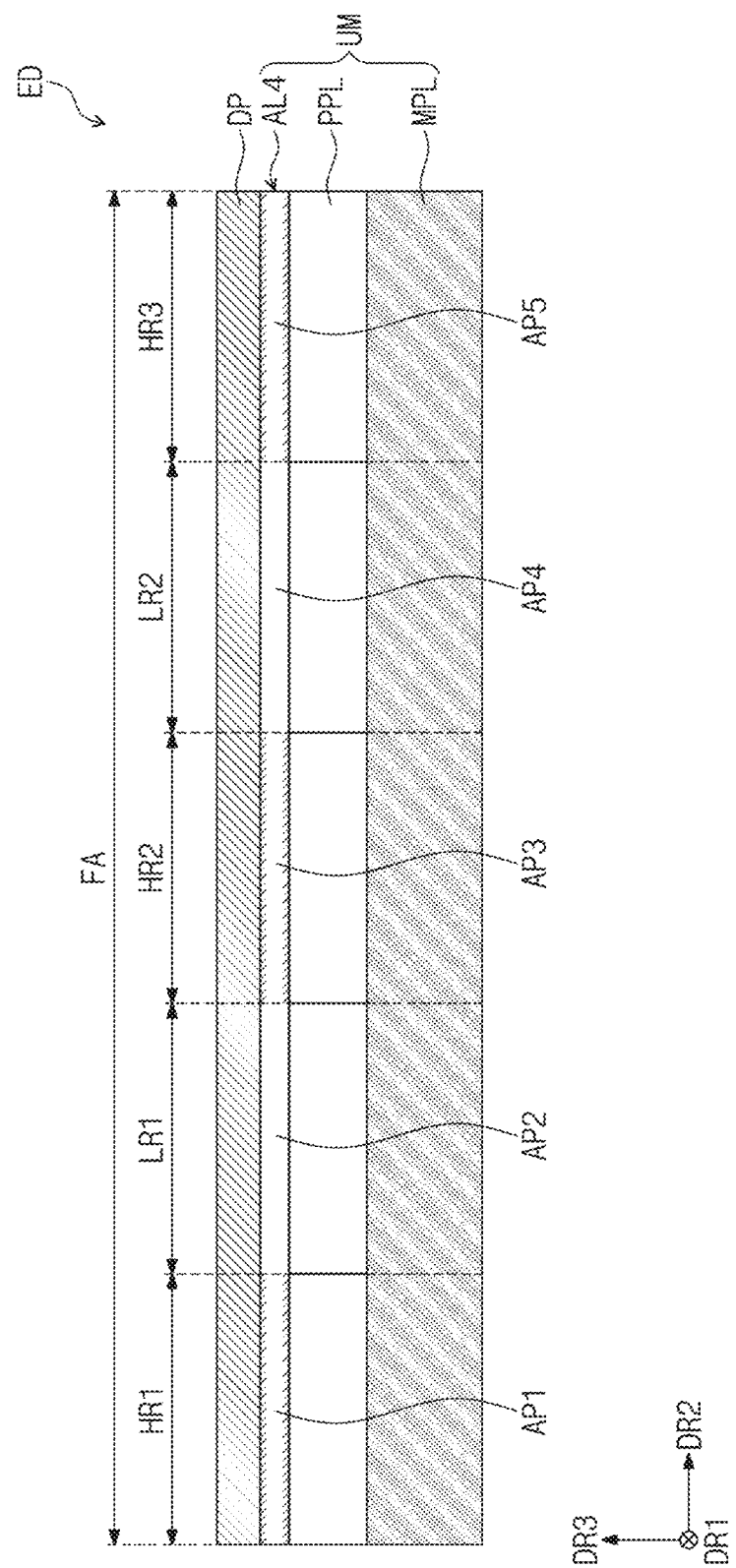
FIG. 12 is a cross-sectional view of a display device according to an embodiment of the invention.

FIG. 12 is a cross-sectional view of a display device ED according to an embodiment of the invention. FIG. 12 illustrates a cross section of the display device ED corresponding to a folding region FA.

Referring to FIG. 12, in an embodiment, a fourth adhesive layer AL4 of a lower member UM may include a plurality of adhesive parts AP1 to AP5 that are disposed to correspond to the folding region FA. In the lower member UM, high-rigidity portions HR1, HR2 and HR3 and low-rigidity portions LR1 and LR2 may be embodied according to a modulus difference between the adhesive parts AP1 to AP5.

The adhesive parts AP1 to AP5 may include first to fifth adhesive parts AP1 to AP5. The first to fifth adhesive parts AP1 to AP5 may correspond to the first high-rigidity part HR1, the first low-rigidity part LR1, the second high-rigidity part HR2, the second low-rigidity part LR2, and the third high-rigidity part HR, respectively.

The adhesive parts AP1 to AP5 may be connected to each other and in the form of one body or a single unitary and indivisible body, and may be distinguished from each other according to arrangement regions. The first, third and fifth adhesive parts AP1, AP3 and AP5, which correspond to the first to third high-rigidity parts HR1, HR2 and HR3, respectively, may each have a relatively great modulus within the fourth adhesive layer AL4 corresponding to the folding region FA. The second and fourth adhesive parts AP2 and AP4, which correspond to the first and second low-rigidity parts LR1 and LR2, respectively, may each have a relatively small modulus within the fourth adhesive layer AL4 corresponding to the folding region FA.

The first, third and fifth adhesive parts APT, AP3 and AP5, each of which has a relatively high modulus, and the second and fourth adhesive parts AP2 and AP4, each of which has a relatively low modulus, may have different moduli from each other caused by a difference in chemical curing or physical curing. In an embodiment, for example, a structure of a material included in each of the first, third and fifth adhesive parts APT, AP3 and AP5, and a structure of a material of included in each of the second and fourth adhesive parts AP2 and AP4, may be made different from each other to embody the fourth adhesive layer AL4 including portions having different moduli. Alternatively, the first to fifth adhesive parts APT to AP5 may include the same ultraviolet curable material, and a degree of curing of the first, third and fifth adhesive parts APT, AP3 and AP5 and a degree of curing of the second and fourth adhesive parts AP2 and AP4 may be made different from each other to embody the fourth adhesive layer AL4 including portions having different moduli from each other.

The fourth adhesive layer AL4 may be disposed not only in the folding region FA but also in the non-folding regions NFA1 and NFA2 (see FIG. 5) described above. In an embodiment, for example, the fourth adhesive layer AL4 may be formed by applying an adhesive material onto the folding region FA and the non-folding regions NFA1 and NFA2 (see FIG. 5) and then making the curing degree different according to the arrangement regions.

Figure 13:
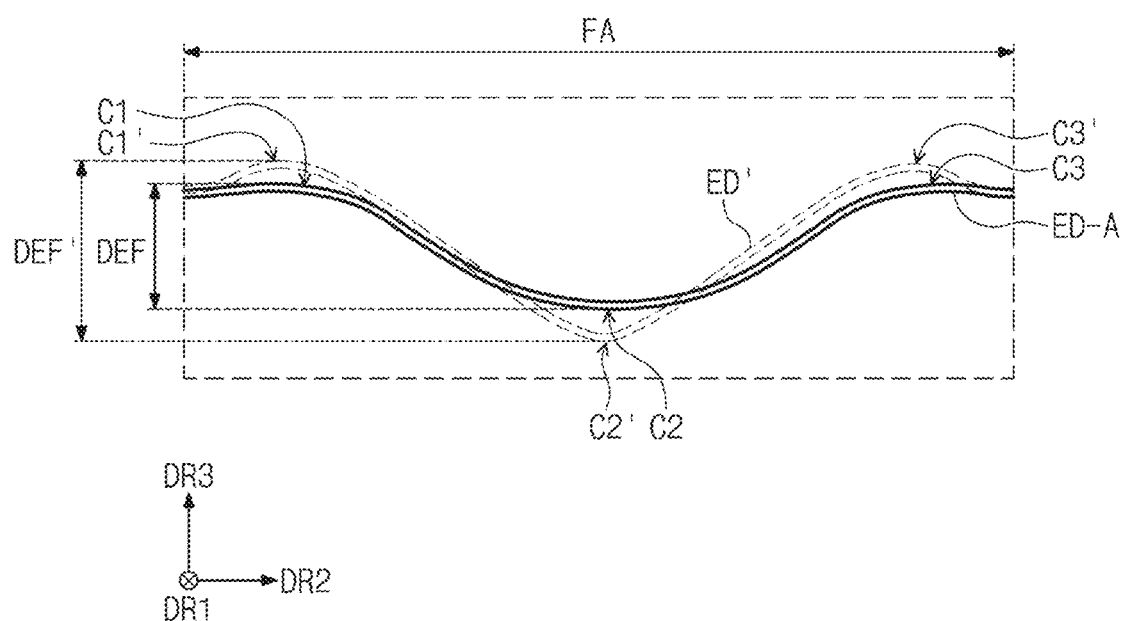
FIG. 13 is a cross-sectional view schematically illustrating a shape of a crease in a folding region according to each of an embodiment of the invention and Comparative Example.

FIG. 13 is a cross-sectional view of a shape of a crease corresponding to a folding region FA of each of a display device ED-A according to Embodiment and a display device ED' according to Comparative Example. FIG. 13 illustrates cross sections of the display devices ED-A and ED' according to Embodiment and Comparative Example, respectively, each of which corresponds to the folding region FA, when viewed in the first direction DR1 parallel to a folding axis.

The display device ED-A according to Embodiment corresponds to the structure of the display device ED in FIG. 5, and the lower member UM (see FIG. 5) includes a first high-rigidity part HR1, a first low-rigidity part LR1, a second high-rigidity part HR2, a second low-rigidity part LR2, and a third high-rigidity part HR3, which correspond to folding region FA and are arranged in sequence in the second direction DR2. The display device ED' according to Comparative Example has substantially the same configuration as the display device ED-A according to Embodiment, but is different in configuration of the lower member. In the display device ED' according to Comparative Example, the lower member has a same (constant or uniform) rigidity in the entire region of the folding region FA.

FIG. 13 schematically illustrates the shape of the crease formed corresponding to the folding region FA in a state in which each of the display device ED-A according to Embodiment and the display device ED' according to Comparative Example is folded for a long time under same environmental conditions and then re-unfolded.

Referring to FIG. 13, the crease of the display device ED-A according to Embodiment may include the most convex first and third points C1 and C3 and the most concave second point C2 within the folding region FA in the third direction DR3. The crease of the display device ED' according to Comparative Example may include the most convex fourth and sixth points C1' and C3' and the most concave fifth point C2' within the folding region FA. In this case, the curvature magnitude at the first to sixth points C1 to C3 and C1' to C3' may correspond to the curvature of the crease.

In the folding region FA, the curvature of the crease of the display device ED-A according to Embodiment may be less than the curvature of the crease of the display device ED' according to Comparative Example. For example, the first to third points C1 to C3 of Embodiment may be relatively gentler than the fourth to sixth points C1' to C3' of Comparative Example.

In the folding region FA of the display device ED-A according to Embodiment, a distance between the first point C1 (or third point C3), which is most convex upwards, and the second point C2, which is most convex downwards, may correspond to a deformation degree DEF of the crease of the display device ED-A according to Embodiment. In the folding region FA of the display device ED' according to Comparative Example, a distance between the fourth point C1' (or sixth point C3'), which is most convex upwards, and the fifth point C2', which is most convex downwards, may correspond to a deformation degree DEF' of the crease of the display device ED' according to Comparative Example.

In the folding region FA, the deformation degree DEF of the crease of the display device ED-A according to Embodiment may be less than the deformation degree DEF' of the crease of the display device ED' according to Comparative Example. For example, the first and third points C1 and C3 of Embodiment may be disposed below the fourth and sixth points C1' and C3' of Comparative Example, respectively, and the second point C2 of Embodiment may be disposed above the fifth point C2' of Comparative Example.

Each of the first and third points C1 and C3 and the fourth and sixth points C1' and C3' may be a point adjacent to either of both sides of the folding region FA within the folding region FA. Each of the second point C2 and the fifth point C2' may be a point corresponding to the middle of the folding region FA within the folding region FA. That is, the middle portion and the both side portions may be bent most within the folding region FA in each of the display devices ED-A and ED' according to Embodiment and Comparative Example, respectively. In the lower member UM (see FIG. 5) of the display device ED-A according to Embodiment, as each of the middle portion and the opposing side portions has relatively high rigidity within the folding region FA, the curvature magnitude and deformation degree of the crease may be reduced. Accordingly, in the display device ED-A according to Embodiment, the crease of the folding region FA may not be visible from the outside when compared to the display device ED' according to Comparative Example.

The lower member included in the display device according to the embodiment of the invention may be disposed below the flexible display panel and protect the display panel.

The lower member according to embodiments of the invention may have relatively high rigidity to correspond to the middle portion and the opposing side portions of the folding region. Accordingly, the deformation degree and the curvature of the crease within the folding region may be reduced, and the crease of the folding region may be prevented from being visible from the outside.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device comprising:
  a display panel including a folding region, which is foldable around a folding axis extending in a first direction, and first and second non-folding regions spaced apart from each other with the folding region therebetween; and
  a lower member disposed below the display panel,
  wherein the lower member comprises a first high-rigidity part, a first low-rigidity part, a second high-rigidity part, a second low-rigidity part, and a third high-rigidity part, each of which extends in the first direction and overlaps the folding region and which are arranged in a second direction crossing the first direction,
  wherein each of the first and second low-rigidity parts has a modulus less than a modulus of a high-rigidity part adjacent thereto in the second direction among the first high-rigidity part, the second high-rigidity part and the third high-rigidity part.

2. The display device of claim 1, wherein the lower member comprises a plate layer, wherein the plate layer comprises
first to third high-rigidity portions corresponding to the first to third high-rigidity parts, respectively, and
first and second low-rigidity portions corresponding to the first and second low-rigidity parts, respectively,
wherein each of the first and second low-rigidity portions has a modulus less than a modulus of a high-rigidity portion adjacent thereto in the second direction among the first to third high-rigidity portions.

3. The display device of claim 2, wherein
the first high-rigidity portion and the third high-rigidity portion are symmetrical with respect to the second high-rigidity portion, and
the first low-rigidity portion and the second low-rigidity portion are symmetrical with respect to the second high-rigidity portion.

4. The display device of claim 2, wherein the first to third high-rigidity portions have a same modulus as each other.

5. The display device of claim 2, wherein at least two selected from the first to third high-rigidity portions have different moduli from each other.

6. The display device of claim 2, wherein opening portions are defined through the plate layer in each of the first and second low-rigidity portions.

7. The display device of claim 2, wherein first opening portions, second opening portions, third opening portions, fourth opening portions, and fifth opening portions are defined in the first high-rigidity portion, the first low-rigidity portion, the second high-rigidity portion, the second low-rigidity portion, and the third high-rigidity portion, respectively.

8. The display device of claim 7, wherein the first to fifth opening portions extend in the first direction and are spaced apart from each other in the second direction.

9. The display device of claim 7, wherein a planar area of each of the first opening portions of the first high-rigidity portion is less than a planar area of each of the second opening portions of the first low-rigidity portion.

10. The display device of claim 7, wherein a gap between the first opening portions of the first high-rigidity portion is greater than a gap between the second opening portions of the first low-rigidity portion in the second direction.

11. The display device of claim 2, wherein recessed portions, each of which is recessed from one surface of the plate layer, are defined in each of the first and second low-rigidity portions.

12. The display device of claim 2, wherein first recessed portions, second recessed portions, third recessed portions, fourth recessed portions, and fifth recessed portions are defined in the first high-rigidity portion, the first low-rigidity portion, the second high-rigidity portion, the second low-rigidity portion, and the third high-rigidity portion, respectively,
wherein the first to fifth recessed portions are spaced apart from each other in the second direction.

13. The display device of claim 12, wherein a width of each of the first recessed portions of the first high-rigidity portion is less than a width of each of the second recessed portions of the first low-rigidity portion in the second direction.

14. The display device of claim 12, wherein a gap between the first recessed portions of the first high-rigidity portion is greater than a gap between the second recessed portions of the first low-rigidity portion in the second direction.

15. The display device of claim 12, wherein a depth of each of the first recessed portions of the first high-rigidity portion is less than a depth of each of the second recessed portions of the first low-rigidity portion in a thickness direction of the plate layer.

16. The display device of claim 2, wherein the first high-rigidity portion has a thickness greater than a thickness of the first low-rigidity portion.

17. The display device of claim 16, wherein the thickness of the first high-rigidity portion is uniform in the second direction.

18. The display device of claim 16, wherein the thickness of the first high-rigidity portion is variable in the second direction.

19. The display device of claim 1, wherein the lower member comprises a cushion layer,
wherein the cushion layer comprises a first cushion part, a second cushion part, a third cushion part, a fourth cushion part, and a fifth cushion part which correspond to the first high-rigidity part, the first low-rigidity part, the second high-rigidity part, the second low-rigidity part, and the third high-rigidity part, respectively,
wherein each of the first to fifth cushion parts comprises a matrix part with pores dispersed in the matrix part,
wherein each of the second cushion part and the fourth cushion part has a modulus less than a modulus of the cushion part adjacent thereto in the second direction.

20. The display device of claim 19, wherein the matrix part of each of the first to fifth cushion parts comprises a same material as each other.

21. The display device of claim 19, wherein a ratio of the pores in the first cushion part is lower than a ratio of the pores in the second cushion part.

22. The display device of claim 1, wherein the lower member comprises a protective layer,
wherein the protective layer comprises a first film part, a second film part, a third film part, a fourth film part, and a fifth film part which correspond to the first high-rigidity part, the first low-rigidity part, the second high-rigidity part, the second low-rigidity part, and the third high-rigidity part, respectively,
wherein each of the second film part and the fourth film part has a modulus less than a modulus of the film part adjacent thereto in the second direction.

23. The display device of claim 1, wherein the lower member comprises a protective layer, and an adhesive layer disposed between the display panel and the protective layer,
wherein the adhesive layer comprises a first adhesive part, a second adhesive part, a third adhesive part, a fourth adhesive part, and a fifth adhesive part which correspond to the first high-rigidity part, the first low-rigidity part, the second high-rigidity part, the second low-rigidity part, and the third high-rigidity part, respectively,
wherein each of the second adhesive part and the fourth adhesive part has a modulus less than a modulus of the adhesive part adjacent thereto in the second direction.

24. The display device of claim 23, wherein the first adhesive part and the second adhesive part comprises a same ultraviolet curable resin as each other,
wherein a curing degree of the first adhesive part is different from a curing degree of the second adhesive part.

25. The display device of claim 1, wherein the display panel comprises:
a first curvature part corresponding to a center of the folding region;
a second curvature part extending from one side of the first curvature part; and a third curvature part extending from an opposing side of the first curvature part, wherein the first curvature part may have a curvature greater than a curvature of each of the second curvature part and the third curvature part, wherein the first to third high-rigidity parts and the first and second low-rigidity parts overlap the first curvature part.

26. An electronic device comprising:

a display device for displaying images, comprising:

a display panel including a folding region, which is foldable around a folding axis and includes one side and an opposing side, each of which extends in a first direction, a first non-folding region extending from the one side, and a second non-folding region extending from the opposing side; and a lower member disposed below the display panel, wherein the lower member comprises a middle high-rigidity part corresponding to a center of the folding region, a first high-rigidity part corresponding to the one side of the folding region, a second high-rigidity part corresponding to the opposing side of the folding region, a first low-rigidity part disposed between the middle high-rigidity part and the first high-rigidity part and having a less modulus than each of the middle high-rigidity part and the first high-rigidity part, and a second low-rigidity part disposed between the middle high-rigidity part and the second high-rigidity part and having a less modulus than each of the middle high-rigidity part and the second high-rigidity part, wherein each of the middle high-rigidity part, the first high-rigidity part, the second high-rigidity part, the first low-rigidity part and the second low-rigidity part extends in the first direction.

27. The electronic device of claim 26, wherein the lower member comprises an adhesive layer, a protective layer, and a plate layer, each of which overlaps the folding region, the first non-folding region, and the second non-folding region, wherein the middle high-rigidity part, the first high-rigidity part, the second high-rigidity part, the first low-rigidity part and the second low-rigidity part are defined in at least one selected from the adhesive layer, the protective layer and the plate layer.

* * * * *